(12) United States Patent
Hanakawa et al.

(10) Patent No.: US 9,901,883 B2
(45) Date of Patent: Feb. 27, 2018

(54) POROUS HOLLOW FIBER MEMBRANE

(71) Applicant: TORAY INDUSTRIES, INC., Tokyo (JP)

(72) Inventors: Masayuki Hanakawa, Shiga (JP); Kenta Iwai, Shiga (JP); Toshiyuki Ishizaki, Shiga (JP); Tamotsu Kitade, Shiga (JP); Masahiro Kimura, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 15/539,355

(22) PCT Filed: Dec. 25, 2015

(86) PCT No.: PCT/JP2015/086332
§ 371 (c)(1),
(2) Date: Jun. 23, 2017

(87) PCT Pub. No.: WO2016/104743
PCT Pub. Date: Jun. 30, 2016

(65) Prior Publication Data
US 2017/0348649 A1    Dec. 7, 2017

(30) Foreign Application Priority Data
Dec. 26, 2014    (JP) .................................. 2014-264345

(51) Int. Cl.
*B01D 33/21*    (2006.01)
*B01D 39/00*    (2006.01)
(Continued)

(52) U.S. Cl.
CPC ............. *B01D 71/34* (2013.01); *B01D 69/02* (2013.01); *B01D 69/08* (2013.01)

(58) Field of Classification Search
None
See application file for complete search history.

(56) References Cited

U.S. PATENT DOCUMENTS

| 5,022,990 A | 6/1991 | Doi et al. |
| 2003/0094409 A1 | 5/2003 | Minegishi et al. |
(Continued)

FOREIGN PATENT DOCUMENTS

| JP | 1-22003 B2 | 4/1989 |
| JP | 2899903 B2 | 6/1999 |
(Continued)

OTHER PUBLICATIONS

International Search Report, issued in PCT/JP2015/086332, PCT/ISA/210, dated Apr. 5, 2016.
(Continued)

*Primary Examiner* — Ana Fortuna
(74) *Attorney, Agent, or Firm* — Birch, Stewart, Kolasch & Birch, LLP

(57) ABSTRACT

An object of the present invention is to provide a porous hollow-fiber membrane having high strength while maintaining high pure-water permeation performance. A porous hollow-fiber membrane of the present invention is a porous hollow-fiber membrane including a fluororesin-based polymer, in which the porous hollow-fiber membrane has a columnar texture oriented in a longitudinal direction of the porous hollow-fiber membrane, and a molecular chain of the fluororesin-based polymer is oriented in the longitudinal direction of the porous hollow-fiber membrane.

8 Claims, 3 Drawing Sheets

10μm

(51) Int. Cl.
  *B01D 39/14* (2006.01)
  *B01D 71/26* (2006.01)
  *B01D 63/02* (2006.01)
  *B01D 71/34* (2006.01)
  *B01D 69/08* (2006.01)
  *B01D 69/02* (2006.01)

(56) References Cited

U.S. PATENT DOCUMENTS

| | | |
|---|---|---|
| 2005/0258101 A1 | 11/2005 | Minegishi et al. |
| 2006/0178480 A1 | 8/2006 | Tada et al. |
| 2007/0090051 A1 | 4/2007 | Minegishi et al. |
| 2008/0156722 A1 | 7/2008 | Suzuki et al. |
| 2009/0206035 A1* | 8/2009 | Takahashi .......... B01D 67/0018 210/636 |
| 2009/0261034 A1* | 10/2009 | Takahashi ............ B01D 63/024 210/500.23 |
| 2012/0160764 A1* | 6/2012 | Tada .................... B01D 67/002 210/500.23 |

FOREIGN PATENT DOCUMENTS

| | | |
|---|---|---|
| JP | 2006-297383 A | 11/2006 |
| JP | 4885539 B2 | 2/2012 |
| WO | WO 03/031038 A1 | 4/2003 |
| WO | WO 2004/081109 A1 | 9/2004 |
| WO | WO 2007/010832 A1 | 1/2007 |

OTHER PUBLICATIONS

Office Action issued in Japanese Patent Application No. 2015-562994 dated Jun. 6, 2017.
Written Opinion of the International Searching Authority, issued in PCT/JP2015/086332, PCT/ISA/237, dated Apr. 5, 2016.

* cited by examiner

10μm

10μm

POROUS HOLLOW FIBER MEMBRANE

TECHNICAL FIELD

The present invention relates to a porous hollow-fiber membrane suitable for various water treatments such as drinking water production, industrial water production, water purification treatment, wastewater treatment, and seawater desalination.

BACKGROUND ART

In recent years, a porous membrane is utilized in a variety of areas, for example, a water treatment field such as water purification treatment and wastewater treatment, a medical application such as blood purification, a food industry field, a battery separator, a charged membrane, and an electrolyte membrane for fuel cells.

Among others, in the drinking water production field and industrial water production field, i.e., the water treatment field such as usage for water purification treatment, wastewater treatment and seawater desalination, a porous membrane is used as an alternative to conventional sand filtration, coagulating sedimentation, evaporation, etc. or for enhancing the quality of treated water. In these fields, since the amount of treated water is large, a porous membrane with excellent water permeation performance makes it possible to reduce the membrane area, provide a compact apparatus and in turn, save the equipment cost and is advantageous in view of membrane exchange cost or footprint.

As the porous membrane for water treatment, a membrane appropriate to the size of a separation target substance contained in water to be treated is used. Usually, natural water contains many suspended components, and a microfiltration membrane or ultrafiltration membrane for removal of suspended components in water is therefore used in general.

In the water treatment, for the purpose of sterilizing permeate or preventing biofouling of separation membrane, a sterilizer such as sodium hypochlorite may be added to the portion of separation membrane module, or as the chemical cleaning of separation membrane, the separation membrane may be washed with an acid such as hydrochloric acid, citric acid and oxalic acid, an alkali such as aqueous sodium hydroxide solution, chlorine, a surfactant, etc. Accordingly, a separation membrane using, as a material having high chemical resistance, a fluororesin-based polymer typified by polyvinylidene fluoride has been recently developed and utilized.

In the water purification treatment field, a problem of a chlorine-resistant pathogenic microorganism such as cryptosporidium getting mixed in with drinking water has become tangible since late 20th century, and strength high enough to allow for no mixing of raw water by preventing membrane breakage is required for the porous hollow-fiber membrane.

In order to obtain a porous hollow-fiber membrane having high water permeability, high strength/elongation and high chemical resistance, various methods have been heretofore proposed. For example, Patent Document 1 discloses a wet solution method using a fluororesin-based polymer. Specifically, in Patent Document 1, a polymer solution prepared by dissolving a fluororesin-based polymer in a good solvent is extruded through a spinneret at a fairly lower temperature than the melting point of the fluororesin-based polymer to put the polymer solution into contact with a liquid containing a non-solvent for the fluororesin-based polymer to thereby form an asymmetric porous structure by way of non-solvent induced phase separation.

However, in the wet solution method, it is difficult to cause phase separation uniformly in the membrane thickness direction, and since a membrane having an asymmetric three-dimensional network structure containing macrovoids is formed, the strength is disadvantageously insufficient. In addition, there is a drawback that many membrane-forming conditions and factors affect the membrane structure or membrane performance and therefore, not only the membrane-forming process is difficult to control but also the reproducibility is poor.

Patent Document 2 discloses a melt-extraction method. Specifically, the following method is described in Patent Document 2. A fluororesin-based polymer is melt-kneaded with an inorganic fine particle and an organic liquid to obtain a membrane-forming raw liquid. This membrane-forming raw liquid is extruded through a spinneret at a temperature not less than the melting point of the fluororesin-based polymer and cooled/solidified. Thereafter, a porous structure is formed by extracting the organic liquid and inorganic fine particle. In the case of melt-extraction method, the void characteristics are easy to control, and a membrane having a relatively homogeneous three-dimensional network structure is obtained without forming macrovoids. However, the strength thereof is not sufficient, and if the inorganic fine particle exhibits poor dispersibility, a defect such as pinhole may occur. Furthermore, the melt-extraction method has a drawback that the production cost becomes extremely high.

Patent Document 3 also discloses a melt-extraction method. In Patent Document 3, two kinds of fluororesin-based polymers differing in the weight average molecular weight are used and after adding a plasticizer and a good solvent thereto, the resulting mixture is melt-extruded into a hollow-fiber membrane shape, cooled/solidified, subjected to extraction of the plasticizer, and further drawn to obtain a porous hollow-fiber membrane in which a mixture of a crystal oriented portion and a crystal non-oriented portion is observed.

Patent Document 4 discloses a method in which a fluororesin-based polymer solution containing a fluororesin-based polymer and a poor solvent therefor and having a temperature not less than the phase separation temperature is ejected into a cooling bath at a temperature not more than the phase separation temperature and solidified to obtain a hollow-fiber membrane.

Furthermore, in Patent Document 5, a fibrous texture having a diameter of 0.9 μm to 3 μm and being oriented in the length direction of a porous hollow-fiber membrane containing a fluororesin-based polymer accounts for 30% or more of the entire porous hollow-fiber membrane, whereby a porous hollow-fiber membrane excellent in strength and pure-water permeation performance is obtained.

BACKGROUND ART DOCUMENT

Patent Document

Patent Document 1: JP-B-1-22003
Patent Document 2: Japanese Patent No. 2899903
Patent Document 3: Japanese Patent No. 4885539
Patent Document 4: WO 03/031038
Patent Document 5: JP-A-2006-297383

SUMMARY OF THE INVENTION

Problems that the Invention is to Solve

It is difficult for the porous hollow-fiber membrane of Patent Document 3 to realize high strength while maintaining practical pure-water permeation performance. The porous hollow-fiber membranes obtained in Patent Documents 4 and 5 are still insufficient, though the strength is enhanced.

Taking into account the problems of the techniques above, an object of the present invention is to provide a porous hollow-fiber membrane having high strength while maintaining high pure-water permeation performance, by using a fluororesin-based polymer having high chemical resistance.

Means for Solving the Problems

The present invention has the following configurations.
(1) A porous hollow-fiber membrane including a fluororesin-based polymer,
  in which the porous hollow-fiber membrane has a columnar texture oriented in a longitudinal direction of the porous hollow-fiber membrane,
  a molecular chain of the fluororesin-based polymer is oriented in the longitudinal direction of the porous hollow-fiber membrane, and
  an orientation degree π of the molecular chain calculated based on the following formula (1) is 0.4 or more and less than 1.0:

Orientation degree $\pi = (180° - H)/180°$ (1)

provided that H is a half-width (°) of a diffraction intensity distribution in a circumferential direction of a wide-angle X-ray diffraction image.
(2) The porous hollow-fiber membrane according to (1), in which the columnar texture has a short-side length of from 0.5 μm to 3 μm, and has an aspect ratio of 3 or more.
(3) The porous hollow-fiber membrane according to (1) or (2), in which the columnar texture has a thickness uniformity of 0.60 or more.
(4) The porous hollow-fiber membrane according to any one of (1) to (3), in which the half-width H is a half-width of an intensity distribution obtained by circumferentially scanning a crystal peak (2θ=20.4°) derived from a (110) plane of polyvinylidene fluoride in wide-angle X-ray diffraction measurement.
(5) The porous hollow-fiber membrane according to any one of (1) to (4), in which, when the wide-angle X-ray diffraction measurement is performed at measurement points at 1 cm intervals in the longitudinal direction of the porous hollow-fiber membrane, the orientation degree π is 0.4 or more and less than 1.0 at 80% or more of the measurement points.
(6) The porous hollow-fiber membrane according to any one of (1) to (5), in which the fluororesin-based polymer is polyvinylidene fluoride, and a Raman orientation parameter ν of the molecular chain obtained by Raman spectroscopy is 3.0 or more.
(7) The porous hollow-fiber membrane according to any one of (1) to (6), which has a porosity of from 50 to 80%.
(8) The porous hollow-fiber membrane according to any one of (1) to (7), which has a pure-water permeation performance at 50 kPa and 25° C. of 0.7 m$^3$/m$^2$/hr or more and a breaking strength of 25 MPa or more.
(9) The porous hollow-fiber membrane according to any one of (1) to (8), which is formed by thermally induced phase separation.
(10) A method for producing a porous hollow-fiber membrane, the method including the following steps 1) and 2):
  1) a step of forming a porous hollow fiber having a columnar texture which is oriented in a length direction and has a thickness uniformity of 0.60 or more and less than 1.00, from a membrane-forming raw liquid containing a fluororesin-based polymer by thermally induced phase separation; and
  2) a step of drawing the porous hollow fiber obtained in 1) to 2.0 to 5.0 times in a longitudinal direction.
(11) The method for producing a porous hollow-fiber membrane according to (10), in which the thermally induced phase separation in the step 1) includes at least one of the following cooling steps a) and b):
  a) a step of dipping the membrane-forming raw liquid in a cooling bath at a temperature Tb satisfying Tc−30° C.<Tb≤Tc; and
  b) a step of dipping the membrane-forming raw liquid in a cooling bath at a temperature Tb1 satisfying Tb1≤Tc−30° C., followed by dipping in a cooling bath at a temperature Tb2 satisfying Tc−30° C.<Tb2≤Tc,
  provided that Tc is a crystallization temperature of the membrane-forming raw liquid containing the fluororesin-based polymer.

Advantage of the Invention

According to the present invention, a porous hollow-fiber membrane having both excellent physical durability and high pure-water permeation performance while possessing excellent chemical durability due to a fluororesin-based polymer having high chemical resistance is provided.

MODE FOR CARRYING OUT THE INVENTION

Figure 1:
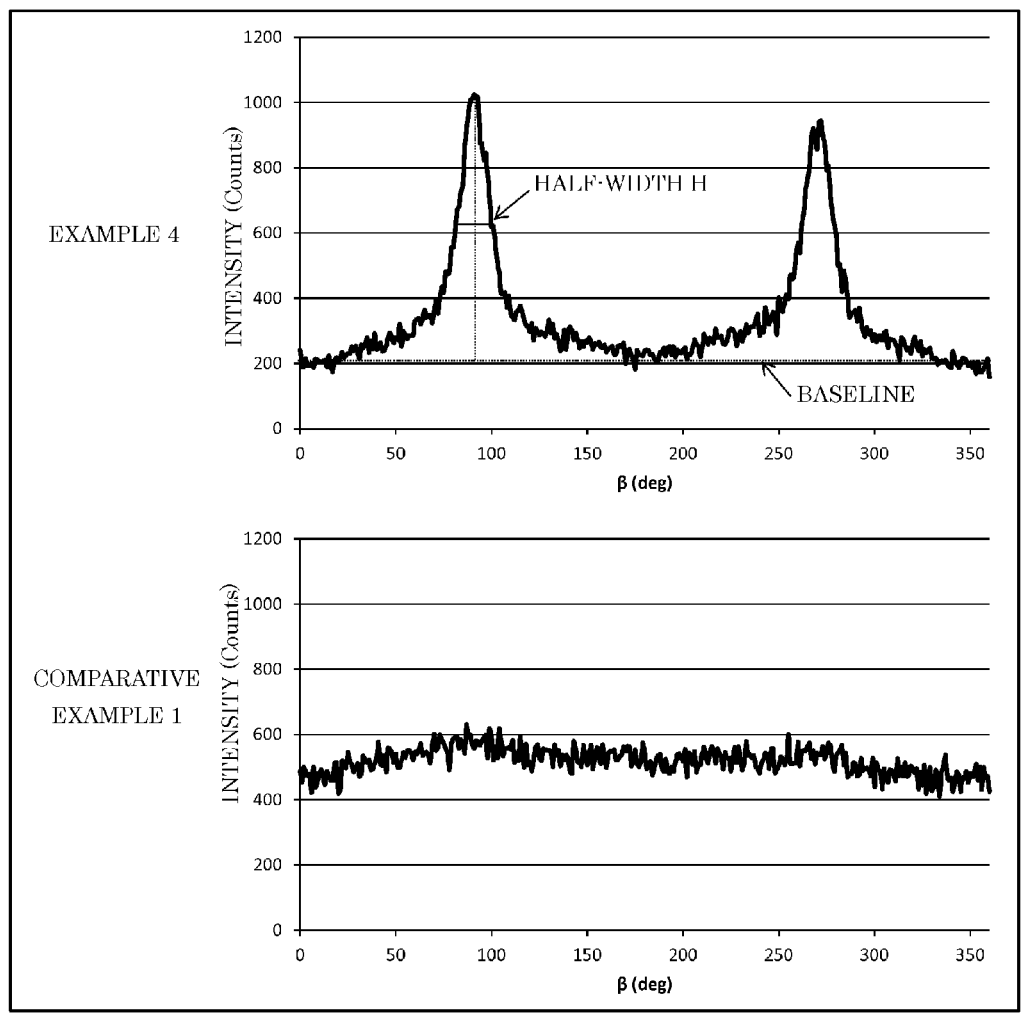
FIG. 1 is a view illustrating the intensity distribution in the azimuth angle direction at 2θ=20.4° of each of the porous hollow-fiber membranes of Example 4 and Comparative Example 1.

1. Porous Hollow-Fiber Membrane
(1-1) Fluororesin-Based Polymer
The porous hollow-fiber membrane of the present invention includes a fluororesin-based polymer.

The fluororesin-based polymer as used in the present description means a resin containing at least one of a vinylidene fluoride homopolymer and a vinylidene fluoride copolymer. The fluorine-based resin polymer may contain a plurality of kinds of vinylidene fluoride copolymers.

The vinylidene fluoride copolymer is a polymer having a vinylidene fluoride residue structure and is typically a copolymer of a vinylidene fluoride monomer with another fluorine-based monomer, etc. Examples of such a copolymer include a copolymer of vinylidene fluoride with one or more kinds of monomers selected from vinyl fluoride, tetrafluoroethylene, hexafluoropropylene and chlorotrifluoroethylene.

In addition, a monomer other than the above-described fluorine-based monomer, for example, ethylene, may be copolymerized to an extent not impairing the effects of the present invention.

The weight average molecular weight of the fluororesin-based polymer may be appropriately selected according to the strength and water permeability required for the polymer separation membrane, but as the weight average molecular weight is larger, the water permeability is reduced, and as the weight average molecular weight is smaller, the strength is reduced. For this reason, the weight average molecular weight of the fluororesin-based polymer is preferably from 50,000 to 1,000,000. In the case of a water treatment application where the polymer separation membrane is subject to chemical cleaning, the weight average molecular weight thereof is preferably from 100,000 to 700,000, more preferably from 150,000 to 600,000.

The porous hollow-fiber membrane preferably includes the fluororesin-based polymer as a main component, and the proportion of the fluororesin-based polymer in the porous hollow-fiber membrane is preferably 80 wt % or more, more preferably 90 wt % or more, still more preferably 95 wt % or more. The porous hollow-fiber membrane may be composed of only the fluororesin-based polymer.

Here, the "porous hollow-fiber membrane including the fluororesin-based polymer as a main component" can be paraphrased as "a porous hollow-fiber membrane based on the fluororesin-based polymer". In the present description, other elements are also described by the phrase "X includes Y as a main component", but in terms of X, this can similarly be rephrased as "based on Y".

(1-2) Orientation of Molecular Chain

In the porous hollow-fiber membrane of the present invention, the molecular chain of the fluororesin-based polymer is oriented in the longitudinal direction of the porous hollow-fiber membrane. The orientation degree $\pi$ of the molecular chain is 0.4 or more and less than 1.0. The orientation degree $\pi$ is calculated from a half-width H (°) obtained by wide-angle X-ray diffraction measurement, based on the following formula (1):

$$\text{Orientation degree } \pi = (180° - H)/180° \tag{1}$$

(provided that H is a half-width (°) of the diffraction intensity distribution in the circumferential direction of a wide-angle X-ray diffraction image).

The orientation of the molecular chain in the longitudinal direction of the porous hollow-fiber membrane and the method for measuring the orientation degree $\pi$ are specifically described below.

In order to calculate the orientation degree $\pi$, the porous hollow-fiber membrane is fixed to a fiber sample stage by arranging its longitudinal direction to run vertically. Here, the short-side direction of the porous hollow-fiber membrane is a direction parallel to the diameter direction of the hollow fiber, and the longitudinal direction is a direction perpendicular to the short-side direction. The short-side direction can be paraphrased as a direction parallel to the hollow plane, i.e., an in-plane direction of the hollow plane, and the longitudinal direction can be paraphrased as a direction perpendicular to the hollow plane.

When X-ray diffraction is performed, an annular diffraction image called a Debye-Scherrer ring is obtained. In the case of a non-oriented sample, a great change is not generated in the diffraction intensity along the Debye-Scherrer ring, but in the case of an oriented sample, the intensity distribution is biased on the Debye-Scherrer ring. Accordingly, the orientation degree can be calculated based on formula (1) from the intensity distribution.

More specifically, in the case where the molecular chain is not oriented, when 2θ/θ scan is performed in the short-side direction (i.e., when a diffraction pattern showing a diffraction intensity distribution in the diameter direction of Debye-Scherrer ring is obtained), a peak is observed at a position near the diffraction angle 2θ=20°. The abscissa axis of the diffraction pattern obtained here is the diffraction angle 2θ of X-ray, and the ordinate axis is the diffraction intensity. Furthermore, the sample is scanned in the azimuth angle β direction by fixing the diffraction angle 2θ to the peak position above, i.e., to near 20°, a diffraction pattern in which the abscissa axis shows the azimuth angle β and the ordinate axis shows the diffraction intensity (i.e., a diffraction intensity distribution along the circumferential direction of Debye-Scherrer ring at the position of diffraction angle 2θ=20°) is obtained. In the case of a non-oriented sample, the diffraction intensity is substantially constant throughout 360° in the circumferential direction of Debye-Scherrer ring.

On the other hand, in the case where the molecular chain is oriented in the longitudinal direction of the porous hollow-fiber membrane, a strong diffraction intensity is observed on the azimuth angle corresponding to the short-side direction of the hollow-fiber membrane on the Debye-Scherrer ring near 2θ=20° (i.e., on the equatorial line), and a small diffraction intensity is obtained in other portions. More specifically, in the case of an oriented sample, the diffraction intensity distribution in the diameter direction of Debye-Scherrer ring shows a diffraction peak near 2θ=20°, similarly to a non-oriented sample, and the distribution in the circumferential direction shows, unlike a non-oriented sample, a diffraction peak on the azimuth angle corresponding to the short-side direction of the hollow-fiber membrane. For example, FIG. 1 which will be described later is a view illustrating the intensity distribution in the azimuth angle direction at 2θ=20.4° of the porous hollow-fiber membrane of Example 4, and in this figure, a peak is observed at β=near 90° and near 270°.

In the description above, the position of diffraction peak in the diameter direction of Debye-Scherrer ring (i.e., the value of 2θ corresponding to the diffraction peak) is "near 20°". However, the value of 2θ differs depending on the structure or blending of a polymer and may range from 15 to 25°. For example, when X-ray diffraction of a polyvinylidene fluoride homopolymer having an α crystal or β crystal is performed, a diffraction peak derived from a (110) plane of α crystal or β crystal, i.e., a plane parallel to molecular chain, is observed near 2θ=20.4°.

As described above, the intensity distribution in the azimuth angle direction is obtained by fixing the value of diffraction angle 2θ and furthermore, measuring the intensity from 0° to 360° in the azimuth angle direction (circumferential direction). This intensity distribution may also be said to be an intensity distribution obtained by scanning the crystal peak in a diffraction image in the circumferential direction. Here, when the ratio between intensity at an azimuth angle of 180° (longitudinal direction) and the intensity at an azimuth angle of 90° (short-side direction) is 0.80 or less or 1.25 or more, a peak is regarded as present, and using the intensity distribution in this azimuth angle direction, the width at a position of half the peak height (half-width H) is determined.

The half-width H is substituted into formula (1), whereby the orientation degree $\pi$ is calculated.

In the porous hollow-fiber membrane of the present invention, the orientation degree $\pi$ of the molecular chain in the longitudinal direction of the porous hollow-fiber membrane is 0.4 or more and less than 1.0, preferably 0.5 or more and less than 1.0, more preferably 0.6 or more and less than 1.0. When the orientation degree $\pi$ is 0.4 or more, the mechanical strength of the porous hollow-fiber membrane is increased. In this connection, when wide-angle X-ray diffraction measurement is performed at measurement points at 1 cm intervals in the longitudinal direction of the porous hollow-fiber membrane, the orientation degree π is preferably 0.4 or more and less than 1.0 at 80% or more of the measurement points.

In the intensity distribution obtained by scanning the crystal peak in the circumferential direction, when the ratio between intensity at an azimuth angle of 180° and the intensity at an azimuth angle of 90° is more than 0.80 and less than 1.25, a peak is regarded as absent. That is, in this case, the fluororesin-based polymer is judged to be non-oriented.

In the case where the hollow-fiber membrane contains α crystal or β crystal of polyvinylidene fluoride, the half-width H is preferably a half-width determined using an intensity distribution obtained by circumferentially scanning the crystal peak)(2θ=20.4°) derived from a (110) plane of α crystal or β crystal of polyvinylidene fluoride in wide-angle X-ray diffraction measurement.

The orientation of the molecular chain of the present invention can be determined by an orientation analysis according to Raman spectroscopy. First, a porous hollow-fiber membrane is sliced by cutting with a microtome from a cross-section along the longitudinal direction of the porous hollow-fiber membrane. The thus-obtained section is observed under an optical microscope, and laser Raman measurement is thereby performed at 1 µm intervals along the longitudinal direction of a columnar texture while confirming the columnar texture. The number of measurement points in one columnar texture is a value obtained by dividing the longitudinal length (µm) of the later-described columnar texture by 1 µm (rounded down to the nearest integer). For example, when the longitudinal length of the columnar texture is 20.5 µm, the number of measurement points is 20.

For example, in the case where the fluororesin-based polymer is a polyvinylidene fluoride homopolymer, the Raman band near 1,270 $cm^{-1}$ is assigned to a coupling mode of $CF_2$ (fluorocarbon) stretching vibration and CC (carbon-carbon) stretching vibration. The vibration direction of these vibrations is in a mode parallel to molecular chain. On the other hand, the vibration direction of the Raman band near 840 $cm^{-1}$ is perpendicular to molecular chain. Strong Raman scattering is obtained when the vibration direction of molecular chain agrees with the polarization direction of incident light, and the scattering intensity ratio of these vibration modes is changed in correlation with the orientation degree.

Consequently, the orientation parameter can be calculated according to the following formula (2). The orientation parameter takes a larger value as the orientation in the longitudinal direction of the porous hollow-fiber membrane is higher, shows 1 in the case of non-orientation, and shows a value smaller than 1 when the orientation in the short-side direction is high.

$$\text{Orientation parameter}=(I1270/I840)\text{parallel}/(I1270/I840)\text{perpendicular} \quad (2)$$

In formula (2), parallel condition: the longitudinal direction of porous hollow-fiber membrane is parallel to polarization direction perpendicular condition: the longitudinal direction of porous hollow-fiber membrane is orthogonal to polarization direction I1270 parallel: intensity of Raman band at 1,270 $cm^{-1}$ under parallel condition I1270 perpendicular: intensity of Raman band at 1,270 $cm^{-1}$ under perpendicular condition I840 parallel: intensity of Raman band at 840 $cm^{-1}$ under parallel condition I840 perpendicular: intensity of Raman band at 840 $cm^{-1}$ under perpendicular condition With respect to one porous hollow-fiber membrane, 10 columnar textures different from each other are selected in the range of 0.5 to 1.5 times the representative value of longitudinal length of the later-described columnar texture, laser Raman measurement is performed on each texture, orientation parameters of respective measurement points are calculated according to formula (2), and an average value thereof is defined as the Raman orientation parameter ν. In addition, an operation of selecting a largest orientation parameter and a smallest orientation parameter among the measurement points of one columnar texture is performed for 10 columnar textures different from each other. With respect to selected 10 largest orientation parameters and 10 smallest parameters, respective average values are determined and defined as a maximum Raman orientation parameter M and a minimum Raman orientation parameter m, and M/m is calculated. In order to accurately determine the Raman orientation parameter ν, maximum Raman orientation parameter M, minimum Raman orientation parameter m, and M/m, the measurement is preferably performed for 20 columnar textures different from each other.

In the porous hollow-fiber membrane of the present invention, the Raman orientation parameter ν of molecular chain in the longitudinal direction of the porous hollow-fiber membrane is preferably 3.0 or more, more preferably 3.4 or more, still more preferably 3.7 or more. With the Raman orientation parameter of 3.0 or more, the strength of the porous hollow-fiber membrane is increased.

It is considered that the maximum Raman orientation parameter M and the minimum Raman orientation parameter m indicate stresses at main orientation site in the columnar texture and during drawing, respectively. Accordingly, M and m may be set to appropriate ranges by taking into account a balance of performances such as strength, elongation and water permeability, but M/m is preferably larger, because this tends to allow for more progress of orientation of the molecular chain and yield higher strength of the porous hollow-fiber membrane. For this reason, in the present invention, M/m is preferably 3 or more, more preferably 4 or more, still more preferably 5 or more.

There is a tendency that the orientation degree π determined by wide-angle X-ray diffraction measurement indicates orientation of the molecular chain of the entire porous hollow-fiber membrane and the Raman orientation parameter ν determined by Raman spectroscopy indicates orientation of the molecular chain when focus is directed onto columnar texture of the porous hollow-fiber membrane, i.e., orientation of the local molecular chain. When both the molecular chain of the entire porous hollow-fiber membrane and the local molecular chain are strongly oriented, the strength of the porous hollow-fiber membrane increases. Accordingly, it is preferred that the orientation degree π is 0.6 or more and less than 1.0 and the Raman orientation parameter ν is 3.4 or more, and it is more preferred that the orientation degree π is 0.7 or more and less than 1.0 and the Raman orientation parameter ν is 3.7 or more.

(1-2) Columnar Texture (a) Dimension

The porous hollow-fiber membrane has a columnar texture oriented in the longitudinal direction of the porous hollow-fiber membrane. The "columnar texture" is a solid material having a shape long in one direction. The aspect ratio (longitudinal length/short-side length) of the columnar texture is preferably 3 or more.

The "longitudinal length" as used herein indicates the length in the longitudinal direction of the columnar texture. The "short-side length" is an average length in the short-side direction of the columnar texture.

The longitudinal length and the short-side length can be measured as follows. A hollow-fiber membrane is cut along the longitudinal direction of the hollow-fiber membrane, and the obtained cross-section is observed using a scanning electron microscope (SEM). The magnification can be varied according to the length of the columnar texture and is set to an extent that a visual field includes the entire figure of each of 5, preferably 10, columnar textures over its longitudinal direction. In the case where a longitudinal-direction length variation is observed in one columnar texture, a maximum length in the longitudinal direction may be measured as the longitudinal direction. The short-side length is determined by measuring the length in each short-side direction at a predetermined number of arbitrary measurement points in one columnar texture and calculating an average value thereof. The number of measurement points is a value obtained by dividing the longitudinal length (μm) by 1 μm (rounded down to the nearest integer). For example, when the longitudinal length of the columnar texture is 20.5 μm, the number of measurement points is 20. In this connection, when the value becomes 21 or more, the measurement may be made at arbitrary 20 sites.

The longitudinal length of the columnar texture is not particularly limited but is preferably 7 μm or more, more preferably 10 μm or more, still more preferably 15 μm or more. The longitudinal length of the columnar texture is, for example, preferably 50 μm or less, more preferably 40 μm or less.

In the present invention, the short-side length of the columnar texture is preferably from 0.5 μm to 3 μm. A short-side length in the range above is preferred, because high strength performance and high pure-water permeation performance are obtained. When the short-side length of the columnar texture is 0.5 μm or more, physical strength of the columnar texture itself is increased, and high strength is obtained. When the short-side length of the columnar texture is 3 μm or less, the void among columnar textures becomes large and in turn, good pure-water permeation performance is obtained. The short-side length of the columnar texture is more preferably from 0.7 μm to 2.5 μm, still more preferably from 1 μm to 2 μm.

In the porous hollow-fiber membrane of the present invention, preferable ranges of the representative value of longitudinal length of the columnar texture and the representative value of short-side length are respectively the same as preferable ranges of longitudinal length and short-side length of the above-described each individual columnar texture. In addition, as for the effects due to each representative value in that range, description of effects when individual columnar textures have a dimension in that range is applied.

The representative value of the longitudinal length is measured as follows. Similarly to the measurement of longitudinal length, the longitudinal length is measured for 5, preferably 10, columnar textures per site at the position of 3 sites, preferably 5 sites, in the hollow-fiber membrane. With respect to the obtained longitudinal length values, an average value is determined and can be used as the representative value of longitudinal length of the columnar texture.

The representative value of the short-side length is determined by measuring the short-side length (calculated as an average value) as described above for columnar textures subject to measurement of the representative value of the longitudinal length and calculating an average value thereof.

In the porous hollow-fiber membrane of the present invention, the representative value of the aspect ratio of the columnar texture calculated from the representative value of the longitudinal length and the representative value of the short-side length is preferably 3 or more, more preferably 5 or more, still more preferably 10 or more, particularly preferably 20 or more.

In the present invention, it is preferred that the short-side length of the columnar texture is from 0.5 μm to 3 μm and the aspect ratio of the columnar texture is 3 or more.

(b) Thickness Uniformity

As described later, the porous hollow-fiber membrane of the present invention can be produced by forming a hollow fiber from a membrane-forming raw liquid containing a polymer and drawing the hollow fiber. For the sake of convenience, the state before drawing is referred to as "hollow fiber", and the state after drawing is referred to as "hollow-fiber membrane".

The thickness uniformity (the later-described average value D) of the columnar texture in the hollow-fiber membrane after drawing is preferably 0.60 or more, more preferably 0.70 or more, still more preferably 0.80 or more, particularly preferably 0.90 or more. Although the thickness uniformity is 1.0 at most, the columnar texture may have a thickness uniformity of less than 1.0.

In the hollow-fiber membrane, the columnar texture has a high thickness uniformity in this way, i.e., a constricted portion is little formed in the columnar texture, and the hollow-fiber membrane thereby exhibits high elongation.

When the porous hollow-fiber membrane after drawing keeps high elongation, this is advantageous in that fiber breakage is less likely to occur even in case of an abrupt application of load. The elongation at break of the porous hollow-fiber membrane is preferably 50% or more, more preferably 80% or more.

The thickness uniformity is described below. As the length variation in each short-side direction of the columnar texture is smaller, a constricted portion is less formed in the columnar texture, leading to a high thickness uniformity, which allows coming close to a perfect column.

The thickness uniformity of the columnar texture is determined by comparing a first cross-section and a second cross-section each running in parallel to the short-side direction of the porous hollow-fiber membrane. This is specifically described below.

First, a first cross-section and a second cross-section running in parallel to each other are selected. The distance between the first face and the second face is set to be 5 μm. In each cross-section, a portion including resin and a void portion are distinguished, and the area of the resin portion and the area of the void portion are measured. Next, the area of a portion where when the first cross-section is projected onto the second cross-section, the portion including resin in the first cross-section and the portion including resin in the second cross-section are overlapped, namely, the overlap area, is determined. With respect to arbitrary 20 pairs of first cross-section and second cross-section in one hollow-fiber membrane, thickness uniformities A and B are determined based on the following formulae (3) and (4), respectively:

Thickness uniformity $A=$(overlap area)/(area of resin portion of second cross-section)      (3)

Thickness uniformity $B=$(overlap area)/(area of resin portion of first cross-section)      (4)

That is, 20 pairs of thickness uniformities A and B are obtained for one hollow-fiber membrane. A larger value means that the thickness of the columnar texture is more uniform. Next, with respect to each pair, an average value C of thickness uniformities A and B is calculated. That is, 20 average values C are obtained for one hollow-fiber membrane. With respect to these average values C, an average value D is further calculated. The average value D is the thickness uniformity of this hollow-fiber membrane.

In the case where 80% or more of 20 average values C calculated for one hollow-fiber membrane are 0.60 or more, the hollow-fiber membrane can be said to have a columnar texture.

In measuring the thickness uniformity, in order to clearly distinguish the resin portion and the void portion, it is preferable to previously perform resin-embedding of the porous hollow-fiber membrane in an epoxy resin, etc. and dyeing treatment of the epoxy resin, etc. with osmium, etc. By such resin embedding/dyeing treatment, the void portion is filled with an epoxy resin, etc., and at the time of cross-sectional processing with a focused ion beam described later, the portion including a fluororesin-based polymer and the void portion (i.e., the epoxy resin portion) can be clearly distinguished, leading to high observation accuracy.

Furthermore, in order to obtain the above-described first cross-section and second cross-section each running in parallel to the short-side direction of the porous hollow-fiber membrane, a scanning electron microscope (SEM) equipped with a focused ion beam (FIB) is preferably used. A face parallel to the short-side direction of the porous hollow-fiber membrane is cut out using FIB, and FIB cutting and SEM observation are repeatedly conducted 200 times at 50 nm intervals toward the longitudinal direction of the porous hollow-fiber membrane. By such continuous cross-section observation, information at a depth of 10 μm can be obtained. Arbitrary first and second cross-sections working out to the faces running in parallel to each other and being spaced 5 μm apart are selected therefrom, and the thickness uniformities can be determined using formulae (3) and (4). The observation magnification may be sufficient if it is a magnification enabling clear identification of a columnar texture and a spherical texture, and, for example, a magnification of 1,000 to 5,000 times may be used.

(c) Composition

The columnar texture includes a fluororesin-based polymer. The columnar texture preferably includes the fluororesin-based polymer as a main component, and the proportion of the fluororesin-based polymer in the columnar texture is preferably 80 wt % or more, more preferably 90 wt % or more, still more preferably 95 wt % or more. The columnar texture may be composed of only the fluororesin-based polymer.

In other words, the porous hollow-fiber membrane has a solid matter containing a fluororesin-based polymer, and at least a part of the solid matter constitutes a columnar texture. All of solid matters containing a fluororesin-based polymer may constitute a columnar texture, or a part thereof may have a shape not falling under a columnar texture. In the porous hollow-fiber membrane, out of solid matters containing a fluororesin-based polymer, the proportion of the solid matter constituting a columnar texture is preferably 80 wt % or more, more preferably 90 wt % or more, still more preferably 95 wt % or more.

(d) Columnar Texture in Hollow-Fiber Membrane

In the porous hollow-fiber membrane, the predominant structure is preferably a columnar texture. In the porous hollow-fiber membrane, the proportion of the columnar texture is preferably 80 wt % or more, more preferably 90 wt % or more, still more preferably 95 wt % or more. The porous hollow-fiber membrane may be composed of only a columnar texture.

More specifically, the porous hollow-fiber membrane preferably has, as the predominant structure, a columnar texture containing a fluororesin-based polymer as a main component.

The porous hollow-fiber membrane can also be phrased as an aggregate of columnar textures.

The "oriented in the longitudinal direction" as used herein means that out of angles between the longitudinal direction of the columnar texture and the longitudinal direction of the porous hollow-fiber membrane, the acute angle is within 20°.

(1-3) Porosity

In the porous hollow-fiber membrane of the present invention, in order to satisfy both high pure-water permeation performance and high strength, the porosity is preferably from 40 to 90%, more preferably from 50 to 80%, still more preferably from 50 to 70%. If the porosity is less than 40%, the pure-water permeation performance is deteriorated, whereas if it exceeds 90%, the strength significantly decreases and in turn, the membrane lacks suitability as a porous hollow-fiber membrane for water treatment. The porosity of the porous hollow-fiber membrane is determined according to the following formula (5) by using the area of the resin portion and the area of the void portion in the above-described cross-section. In order to increase the accuracy, it is preferable to determine the porosity for arbitrary 20 or more, preferably 30 or more, cross-sections and use an average value thereof.

$$\text{Porosity (\%)} = \{100 \times (\text{area of void portion})\}/\{(\text{area of resin portion}) + (\text{area of void portion})\} \quad (5)$$

(1-4) Others

The porous hollow-fiber membrane of the present invention may contain a texture other than the above-described columnar texture, to the extent not deviating from the object of the present invention. The structure other than the columnar texture includes, for example, a spherical texture having an aspect ratio (longitudinal length/short-side length) of less than 3. The short-side length and longitudinal length of the spherical texture are preferably from 0.5 μm to 3 μm. In the case of using a spherical texture, when the short-side length and longitudinal length thereof are in the range above, reduction in the strength of the porous hollow-fiber membrane can be suppressed, and good pure-water permeation performance can be maintained.

However, if the proportion of such a spherical texture having an aspect ratio of less than 3 in the porous hollow-fiber membrane becomes large, it is likely that spherical textures are increasingly coupled with each other and the constricted portion is increased, making it difficult to perform high-ratio drawing or keep the elongation after drawing. For this reason, a smaller proportion of spherical texture in the porous hollow-fiber membrane is more preferred. The proportion thereof is preferably less than 20%, more preferably less than 10%, still more preferably less than 1%, i.e., almost nil, and it is best if the spherical texture is not present at all.

Here, the occupancy (%) of each texture is determined according to the following formula (6) by taking a photograph of a cross-section in the longitudinal direction of the porous hollow-fiber membrane by means of SEM, etc. at a magnification enabling clear identification of a columnar texture and a spherical texture, preferably at a magnification of 1,000 to 5,000 times. In order to increase the accuracy, it is preferable to determine the occupancy for arbitrary 20 or more, preferably 30 or more, cross-sections and calculate an average value thereof.

$$\text{Occupancy (\%)} = \{(\text{area occupied by each texture})/(\text{area of entire photograph})\} \times 100 \qquad (6)$$

Incidentally, the area of the entire photograph and the area occupied by a texture can be determined preferably by employing a method of converting the area into a weight corresponding to each texture photographed. That is, after the photograph taken is printed on paper, the weight of paper corresponding to the entire photograph and the weight of paper corresponding to a texture portion cut out therefrom may be measured. In advance of taking a photograph by SEM, etc., the above-described resin embedding/dyeing treatment and FIB cutting are preferably applied, because the observation accuracy becomes high.

The porous hollow-fiber membrane of the present invention may be a membrane in which a layer having the above-described columnar texture and a layer having another structure are stacked, without deviating from the object of the present invention. However, if the thickness of the layer having another structure becomes large as compared with the layer having a columnar texture, the object/effects of the present invention are less likely to be exerted, and therefore, the ratio of the thickness of the layer having another structure to the thickness of the layer having a columnar texture is preferably 0.3 or less, more preferably 0.2 or less.

In the porous hollow-fiber membrane of the present invention, it is preferred that the pure-water permeation performance at 50 kPa and 25° C. is 0.7 m$^3$/m$^2$/hr or more and the breaking strength is 25 MPa or more, and it is more preferred that the pure-water permeation performance at 50 kPa and 25° C. is 0.7 m$^3$/m$^2$/hr or more and the breaking strength is 30 MPa or more. Above all, from the viewpoint of forming a high-performance hollow-fiber membrane satisfying both high pure-water permeation performance and high strength performance, it is preferred that the pure-water permeation performance at 50 kPa and 25° C. is from 0.7 to 5.0 m$^3$/m$^2$/hr and the breaking strength is from 25 to 70 MPa, and it is more preferred that the pure-water permeation performance at 50 kPa and 25° C. is from 0.7 to 5.0 m$^3$/m$^2$/hr and the breaking strength is from 30 to 70 MPa.

The measurement of pure-water permeation performance is performed by manufacturing a miniature module of 200 mm in length including 4 porous hollow-fiber membranes. External-pressure dead-end filtration of reverse osmosis membrane filtrate is performed for 10 minutes under the conditions of a temperature of 25° C. and a filtration pressure difference of 16 kPa, and the permeation amount (m$^3$) is determined. The permeation amount (m$^3$) is converted into a value per unit time (h) and effective membrane area (m$^2$), further multiplied by (50/16), thereby being converted into a value at a pressure of 50 kPa to determine the pure-water permeation performance.

The methods for measuring the breaking strength and the elongation at break are not particularly limited but, for example, using a tensile tester, a tensile test of a sample having a measurement length of 50 mm is performed 5 or more times at a tensile speed of 50 mm/min by changing the sample, and the breaking strength and the elongation at break can be measured by determining average values thereof.

The porous hollow-fiber membrane described above has sufficient pure-water permeation performance, strength and elongation for various water treatments such as drinking water production, industrial water production, water purification treatment, wastewater treatment, and seawater desalination.

2. Production Method of Porous Hollow-Fiber Membrane

The method for producing the porous hollow-fiber membrane of the present invention is described below by way of example. The method for producing a porous hollow-fiber membrane includes at least:

1) a step of forming a hollow fiber having a columnar texture which is oriented in the length direction and has a thickness uniformity of 0.60 or more and less than 1.00, from a membrane-forming raw liquid containing a fluororesin-based polymer by thermally induced phase separation; and 2) a step of drawing the porous hollow fiber obtained in 1) above to 2.0 to 5.0 times in the longitudinal direction.

(2-1) Preparation of Membrane-Forming Raw Liquid

The production method of a porous hollow-fiber membrane in the present invention further includes a step of preparing a fluororesin-based polymer solution. A fluororesin-based polymer solution (i.e., a membrane-forming raw liquid containing a fluororesin-based polymer) is prepared by dissolving a fluororesin-based polymer in a poor or good solvent for the fluororesin-based polymer at a relatively high temperature of not less than the crystallization temperature.

When the polymer concentration in the membrane-forming raw liquid is high, a porous hollow-fiber membrane having high strength is obtained. On the other hand, when the polymer concentration is low, the porosity of the porous hollow-fiber membrane becomes large, and the pure-water permeation performance is enhanced. Accordingly, the concentration of the fluororesin-based polymer is preferably from 20 to 60 wt %, more preferably from 30 to 50 wt %.

In the present specification, the poor solvent is a solvent in which the fluororesin-based polymer cannot be dissolved in a concentration of 5 wt % or more at a low temperature of 60° C. or less but can be dissolved in a concentration of 5 wt % or more in a high-temperature region between 60° C. or more and not more than the melting point of the fluororesin-based polymer (for example, when the polymer is composed of a vinylidene fluoride homopolymer alone, about 178° C.). The good solvent is a solvent in which the fluororesin-based polymer can be dissolved in a concentration of 5 wt % or more even in a low-temperature region of 60° C. or less, and the non-solvent is defined as a solvent in which the fluororesin-based polymer is neither dissolved nor swollen at a temperature up to the melting point of the fluororesin-based polymer or the boiling point of the solvent.

Examples of the poor solvent for the fluororesin-based polymer include cyclohexanone, isophorone, γ-butyrolactone, methyl isoamyl ketone, propylene carbonate, dimethyl sulfoxide, etc., and a mixed solvent thereof. Examples of the good solvent include N-methyl-2-pyrrolidone, dimethylacetamide, dimethylformamide, methyl ethyl ketone, acetone, tetrahydrofuran, tetramethylurea, trimethyl phosphate, etc., and a mixed solvent thereof. Examples of the non-solvent include water, hexane, pentane, benzene, toluene, methanol, ethanol, carbon tetrachloride, o-dichlorobenzene, trichloroethylene, ethylene glycol, diethylene glycol, triethylene glycol, propylene glycol, butylene glycol, pentanediol, hexanediol, an aliphatic hydrocarbon such as low-molecular-weight polyethylene glycol, an aromatic hydrocarbon, an aliphatic polyhydric alcohol, an aromatic polyhydric alcohol, a chlorinated hydrocarbon, other chlorinated organic liquids, and a mixed solvent thereof.

(2-2) Formation of Hollow Fiber

In the hollow fiber forming step, a hollow fiber is obtained from a membrane-forming raw liquid containing a fluororesin-based polymer by utilizing a thermally induced phase separation method of inducing phase separation by temperature change. In order to perform the later-described high-ratio drawing of 2.0 times or more, it is preferred that the hollow fiber has a columnar texture oriented in its length direction and the thickness uniformity of the columnar texture is 0.6 or more and less than 1.00. The lower limit of the thickness uniformity of the columnar texture is more preferably 0.70 or more, still more preferably 0.80 or more, particularly preferably 0.90 or more.

In the thermally induced phase separation method, two kinds of phase separation mechanisms are mainly utilized. One is a liquid-liquid separation method in which a polymer solution dissolved uniformly at a high temperature is separated into a polymer thick phase and a polymer thin phase due to reduction in the dissolving ability of the solution during a temperature drop and the structure is thereafter fixed by crystallization. Another is a solid-liquid phase separation method in which a polymer solution dissolved uniformly at a high temperature is phase-separated into a polymer solid phase and a solvent phase due to occurrence of crystallization of the polymer during a temperature drop.

A three-dimensional network structure is mainly formed in the former method, and a spherical structure constituted by a spherical texture is mainly formed in the latter method. In the production of the hollow-fiber membrane of the present invention, the latter phase separation mechanism is preferably utilized. Accordingly, a polymer concentration and a solvent, inducing solid-liquid phase separation, are selected. In the former phase separation mechanism, it is difficult to develop the above-described columnar texture oriented in the length direction of the hollow-fiber membrane. Because, the polymer thick phase forms a very fine phase by phase separation before the structure is fixed, and cannot be made columnar.

As a specific method, a hollow part-forming liquid is ejected through an inner tube of a double tube-type spinneret for spinning of a porous hollow-fiber membrane while ejecting the above-described membrane-forming raw liquid through an outer tube of the double tube-type spinneret. The thus-ejected membrane-forming raw liquid is cooled and solidified in a cooling bath to obtain a porous hollow-fiber membrane.

The fluororesin-based polymer solution is, before being ejected through the spinneret, held to a specific temperature condition for a predetermined time under pressure. The pressure is preferably 0.5 MPa or more, more preferably 1.0 MPa or more. The temperature T of the polymer solution preferably satisfies $Tc+35°\ C.\leq T\leq Tc+60°\ C.$, more preferably satisfies $Tc+40°\ C.\leq T\leq Tc+55°\ C.$ Tc is a crystallization temperature of the fluororesin-based polymer solution. The time for which the polymer solution is held under these pressure and temperature is preferably 10 seconds or more, more preferably 20 second or more.

Specifically, a staying part for allowing the polymer solution to stay is provided at any site of a solution sending line of delivering the polymer solution to the spinneret, and a pressurizing unit for applying a pressure to the staying polymer solution and a temperature-adjusting unit for adjusting the temperature of the staying polymer solution (for example, a heating unit) are provided. The pressurizing unit is not particularly limited, but by disposing two or more pumps in the solution sending line, a pressure can be applied to any site therebetween. Examples of the pump include a piston pump, a plunger pump, a diaphragm pump, a wing pump, a gear pump, a rotary pump, and a screw pump, and two or more kinds of pumps may be used.

Since this step allows a pressure to be applied under the conditions favorable to crystallization, it is presumed that crystal growth has anisotropy and in turn, not an isotropic spherical structure but a texture oriented in the length direction of the porous hollow-fiber membrane is developed, as a result, a columnar structure is obtained.

Here, the crystallization temperature Tc of the fluororesin-based polymer solution is defined as follows. Using an apparatus for differential scanning calorimetry (DSC measurement), a mixture having the same composition as the membrane-forming polymer raw liquid composition containing a fluororesin-based polymer, a solvent, etc. is sealed in a sealing type DSC container and uniformly dissolved by raising the temperature to a dissolution temperature at a temperature rise rate of 10° C./min and holding the temperature for 30 minutes, and Tc is a rise temperature of a crystallization peak observed in the process of thereafter lowering the temperature at a temperature drop rate of 10° C./min.

The cooling bath for cooling the fluororesin-based polymer solution ejected through the spinneret is described below. In the cooling bath, a mixed liquid including a poor or good solvent in a concentration of 50 to 95 wt % and a non-solvent in a concentration of 5 to 50 wt % is preferably used. As the poor solvent, the same poor solvent as that for the polymer solution is preferably used. For the hollow part-forming liquid, as with the cooling bath, a mixed liquid including a poor or good solvent in a concentration of 50 to 95 wt % and a non-solvent in a concentration of 5 to 50 wt % is preferably used. As the poor solvent, the same poor solvent as that for the polymer solution is preferably employed.

Here, in order to develop not a fibrous texture having a large number of constricted portions but a columnar texture having a uniform thickness, it is preferable to promote polymer uptake/growth into the constricted portion. The present inventors have found that the polymer uptake/growth into the constricted portion leads to disappearance of a constricted portion having high interface energy and can be energetically stabilized and therefore caused to preferentially occur over the growth in portions other than the constricted portion, and have made intensive studies on the method for enhancing the thickness uniformity.

As a result, it has been found that as the method for promoting the polymer uptake/growth into the constricted portion, the thermally induced phase separation preferably includes at least one of the following cooling steps a) and b):

a) a step of dipping the membrane-forming raw liquid in a cooling bath at a temperature Tb satisfying $Tc-30°\ C.<Tb\leq Tc$; and b) a step of dipping the membrane-forming raw liquid in a cooling bath at a temperature Tb1 satisfying $Tb1\leq Tc-30°\ C.$, followed by dipping in a cooling bath at a temperature Tb2 satisfying $Tc-30°\ C.<Tb2\leq Tc$, (provided that Tc is a crystallization temperature of the membrane-forming raw liquid containing a fluororesin-based polymer).

In the present invention, it has been found that as the method a), when cooling/solidification in a cooling bath is performed near the crystallization temperature of the polymer solution, the cooling/solidification is caused to slowly proceed. In this case, when the temperature Tb of the cooling bath is set to the crystallization temperature Tc of the fluororesin-based polymer solution, Tc−30° C.<Tb≤Tc is satisfied, and Tc−20° C.<Tb≤Tc is more preferred.

The passing time of the cooling bath (i.e., dipping time in the cooling bath) is not particularly limited if enough time for the thermally induced phase separation including the polymer uptake/growth into the constricted portion to complete can be ensured, and the passing time may be experimentally determined by taking into account the number of hollow-fiber membranes, the spinning speed, the bath ratio, the cooling capacity, etc.

In order to achieve thickness uniformity, the passing time is preferably set to be as long as possible in the above-described temperature range of the cooling bath and may be, for example, 10 seconds or more, preferably 20 seconds or more, more preferably 30 seconds or more.

As the method b), two or more stages of cooling may be performed. Specifically, the cooling step may include a step of cooling the solution by using a first cooling bath for increasing the supercooling degree, thereby promoting generation/growth of a crystal nucleus, and a step of thereafter cooling the solution by using a second cooling bath for promoting polymer uptake/growth into the constricted portion. The cooling step by the second cooling bath utilizes a phenomenon that the polymer uptake/growth into the constricted portion preferentially occurs mainly in the structure coarsening process of phase separation.

In this case, when the temperature Tb1 of the first cooling bath for cooling the fluororesin polymer solution ejected through the spinneret satisfies Tb1≤Tc−30° C., the generation and growth of a crystal nucleus can be promoted by increasing the supercooling degree, and when the temperature Tb2 of the second cooling bath is set near the crystallization temperature (specifically, set to satisfy Tc−30° C.<Tb2≤Tc, more preferably Tc−20° C.<Tb2≤Tc), the polymer uptake/growth into the constricted portion can be promoted. Tc is the crystallization temperature of the polymer solution.

The passing time of each cooling bath can be varied, but it is preferable to, for example, set the passing time of the first cooling bath to be from 1 to 20 seconds, preferably from 3 to 15 seconds, more preferably from 5 to 10 seconds, and the passing time of the second cooling bath to be 10 seconds or more, preferably 20 seconds or more, more preferably 30 seconds or more.

When a texture having a thickness uniformity of less than 0.60 is referred to as "fibrous texture" so as to distinguish it from the columnar texture, the hollow-fiber membrane disclosed in JP-A-2006-297383 (Patent Document 5) is a hollow-fiber membrane having a fibrous texture. Such a porous hollow-fiber membrane having a fibrous texture is relatively excellent in strength and pure-water permeation performance, and the present inventors have therefore attempted to increase the strength by drawing this membrane. However, it has been found that the membrane cannot be uniformly drawn and the strength cannot be increased.

In general, a porous membrane used for water treatment has a large number of void parts for passing water and since destruction of the texture proceeds starting from a void part at the time of drawing, drawing itself is very difficult. This tendency is prominent, in particular, when the porous hollow-fiber membrane has a phase-separation porous structure obtained by dry-wet spinning utilizing a principle of non-solvent induced phase separation or thermally induced phase separation, because a large number of fine voids are present and the porosity is high.

In the case of the porous membrane having a fibrous texture of Patent Document 5, it is considered that stress during drawing is dispersed by the fibrous texture oriented in the longitudinal direction, and drawing can be performed, though the draw ratio is as low as less than 2.0 times. However, it is still difficult to uniformly conduct high-rate drawing of 2.0 times or more, and as a result of intensive studies on the cause thereof, it has been found that a fibrous structure has many constricted portions and since a stress is concentrated at the constricted portion during drawing, the constricted portion is preferentially drawn, making it impossible to uniformly draw the entire fibrous texture, as a result, the draw ratio cannot be increased.

On the other hand, the present inventors have found that as long as it is a hollow fiber having a columnar texture with uniform thickness but not a fibrous texture having a large number of constricted portions described in Patent Document 5, not a network structure described in Patent document 3 and not a spherical structure described in Patent Document 4, the entire columnar texture can be uniformly drawn and consequently, high-ratio drawing of 2.0 times or more becomes possible. By virtue of such uniform and high-ratio drawing, the present inventors have succeeded in drawing and orienting the molecular chain of a fluororesin-based polymer in the longitudinal direction of a porous hollow-fiber membrane and succeeded in increasing the strength while maintaining high pure-water permeation performance.

(2-3) Drawing

Finally, in the present invention, the porous hollow-fiber membrane including a fluororesin-based polymer having a columnar texture, obtained by the method above, is drawn at a high ratio to orient the molecular chain of the polymer.

The draw ratio is from 2.0 to 5.0 times, more preferably from 2.5 to 4.0 times, still more preferably from 2.5 to 3.5 times. If the draw ratio is less than 2.0 times, orientation of the molecular chain due to drawing is insufficient, and if the draw ratio exceeds 5.0 times, reduction of the elongation increases.

The drawing temperature is preferably from 60 to 140° C., more preferably from 70 to 120° C., still more preferably from 80 to 100° C., and if the membrane is drawn in a low-temperature atmosphere of less than 60° C., it is difficult to stably and homogeneously draw the membrane. If the membrane is drawn at a temperature exceeding 140° C., since the temperature is close the melting point of the fluororesin-based polymer, the structure texture may be melted to reduce the pure-water permeation performance.

Drawing in a liquid is preferred, because the temperature control is easy, but the drawing may be performed in a gas such as steam. As the liquid, water is simple and preferred, but in the case of drawing at about 90° C. or more, use of a low-molecular-weight polyethylene glycol, etc. may be preferably employed.

EXAMPLES

The present invention is described below by referring to specific Examples, but the present invention is not limited to these Examples. Incidentally, physical values relating to the present invention can be measured by the following methods.

(1) Pure-Water Permeation Performance

A compact module including 4 porous hollow-fiber membranes and having an effective length of 200 mm was manufactured. Distilled water was delivered to the module over 1 hour under the conditions of a temperature of 25° C.

and a filtration pressure difference of 16 kPa, and the amount (m³) of the obtained permeate was determined, converted into a value per unit time (h) and unit membrane area (m²), further converted in terms of a pressure (50 kPa), and used as the pure-water permeation performance (m³/m²/h). The unit membrane area was calculated from the average outer diameter and the effective length of the porous hollow-fiber membrane.

(2) Breaking Strength, Elongation at Break

Using a tensile tester (TENSILON®)/RTM-100, manufactured by Toyo Baldwin Co., Ltd.), a sample having a measurement length of 50 mm was tested 5 or more times at a tensile speed of 50 mm/min by changing the sample, and the breaking strength and elongation at break were calculated by determining average values thereof.

(3) Orientation Degree π of Molecular Chain in Longitudinal Direction of Porous Hollow-Fiber Membrane The porous hollow-fiber membrane was fixed to a fiber sample stage by arranging its longitudinal direction to run vertically, and X-ray diffraction (2θ/θ scan, β scan) was performed using an X-ray diffractometer (manufactured by Rigaku Corporation, SmartLab for polymer, CuKα ray). First, it was confirmed by 2θ/θ scan that a peak top is present at 2θ=20.4°. Next, the intensity in the range from 0° to 360° in the azimuth angle direction, relative to the diffraction peak at 2θ=20.4°, was measured by β scan to obtain an intensity distribution in the azimuth angle direction. Here, by regarding a peak as being present when the ratio between the intensity at an azimuth angle of 180° and the intensity at an azimuth angle of 90° was 0.80 or less or 1.25 or more, the width at a position of half the peak height (half-width H) was determined using the intensity distribution in this azimuth angle direction, and the orientation degree π was calculated according to the following formula (1). Incidentally, since a minimum intensity value in β scan was observed at 0° and around 180°, a straight line passing these points was used as the baseline.

$$\text{Orientation degree} \pi = (180° - H)/180° \tag{1}$$

(4) Raman Orientation Parameter ν

The orientation parameter of the polyvinylidene fluoride homopolymer in the porous hollow-fiber membrane was determine by the following operation.

A cross-section in the longitudinal direction of the porous hollow-fiber membrane was sliced by cutting with a microtome, and 10 columnar textures were selected per one porous hollow-fiber membrane. With respect to each columnar texture, the scattering intensity was measured by Raman spectroscopy at 1 μm intervals along the longitudinal direction while confirming the columnar texture by means of an optical microscope.

The orientation parameter of each texture was calculated according to formula (2), and the average value of respective orientation parameters was defined as the Raman parameter ν. In addition, in each of 10 columnar textures different from each other, a largest orientation parameter and a smallest orientation parameter were selected, respective average values were determined and defined as a maximum Raman orientation parameter M and a minimum Raman orientation parameter m, and M/m was calculated.

$$\text{Orientation parameter} = (I1270/I840)\text{parallel}/(I1270/I840)\text{perpendicular} \tag{2}$$

provided that parallel condition: the longitudinal direction of porous hollow-fiber membrane is parallel to polarization direction perpendicular condition: the longitudinal direction of porous hollow-fiber membrane is orthogonal to polarization direction I1270 parallel: intensity of Raman band at 1,270 cm$^{-1}$ under parallel condition I1270 perpendicular: intensity of Raman band at 1,270 cm$^{-1}$ under perpendicular condition I840 parallel: intensity of Raman band at 840 cm$^{-1}$ under parallel condition I840 perpendicular: intensity of Raman band at 840 cm$^{-1}$ under perpendicular condition.

The laser Raman spectrometer and measurement conditions are as follows.

Apparatus: Jobin Yvon/Atago Bussan, T-64000
Conditions:
Measurement mode; macro-Raman
Object lens; ×100
Beam diameter; 1 μm
Light source; Ar+laser/514.5 nm
Laser power: 100 mW
Diffraction grating: Single 600 gr/mm
Slit: 100 μm
Detector: CCD/Jobin Yvon 1024×256

(5) Longitudinal Length and Short-Side Length of Columnar Texture

With respect to the porous hollow-fiber membrane manufactured in each Example, a photograph of a cross-section along the longitudinal direction was taken at a magnification of 3,000 times by means of a scanning electron microscope. From the image photographed, 10 columnar textures were arbitrarily selected, and the longitudinal length and short-side length of each texture were measured. Here, the maximum length in the longitudinal direction was measured as the longitudinal length of each columnar texture. In addition, as described above, a value obtained by dividing the longitudinal length of each columnar texture by 1 μm and rounding it down to the nearest integer was taken as the number of measurement points, and after measuring the length in the short-side direction, an average value thereof was calculated to determine the short-side length of each columnar texture.

The above-described photographing was performed at 5 sites, and the longitudinal length and the short-side length were determined for arbitrary 10 columnar textures at each site to obtain a total of 50 longitudinal lengths and a total of 50 short-side lengths. Subsequently, an average value of the total of 50 longitudinal lengths was calculated and taken as the representative value of longitudinal length, and an average value of the total of 50 short-side lengths was calculated and taken as the representative value of short-side length.

(6) Thickness Uniformity

First, the porous hollow-fiber membrane was resin-embedded in an epoxy resin and subjected to osmium dyeing treatment, and the void portion was thereby filled with an epoxy resin. Next, using a scanning electron microscope (SEM) equipped with a focused ion beam (FIB), a face parallel to the short-side direction of the porous hollow-fiber membrane was cut out using FIB, and FIB cutting and SEM observation were repeatedly conducted 200 times at 50 nm intervals toward the longitudinal direction of the porous hollow-fiber membrane to obtain information at a depth of 10 μm.

The thickness uniformity was determined by comparing a first cross-section and a second cross-section each running in parallel to the short-side direction of the porous hollow-fiber membrane, which were obtained in continuous cross-section observation using FIB above. Here, 20 pairs of first cross-section and second cross-section were selected so that these cross-sections work out to faces running in parallel to each other and being spaced 5 μm apart. First, in each cross-section, a portion including resin and a void portion (epoxy portion) were distinguished, and the area of the resin portion and the area of the void portion were measured. Subsequently, the area of a portion where when the first cross-section is projected onto the second cross-section from a direction perpendicular to both cross-sections, the portion including resin in the first cross-section and the portion including resin in the second cross-section are overlapped, was determined and taken as the overlap area. The thickness uniformity was calculated as a value determined by averaging thickness uniformities A and B obtained according to the following formulae (3) and (4), and an average value of 20 pairs was employed. The membrane was judged to have a columnar texture when 16 pairs or more have a thickness uniformity of 0.60 or more, and judged to have a fibrous texture when 15 pairs or less have the thickness uniformity above.

Thickness uniformity $A$=(overlap area)/(area of resin portion of second cross-section) (3)

Thickness uniformity $B$=(overlap area)/(area of resin portion of first cross-section) (4)

(7) Porosity

The porosity was determined according to the following formula (5) by using the area of the resin portion and the area of the void portion in arbitrary 20 cross-sections selected from 20 pairs of first cross-section and second cross-section obtained in "(6) Thickness Uniformity", i.e., a total of 40 cross-sections, and an average value thereof was used.

Porosity (%)={100×(area of void portion)}/{(area of resin portion)+(area of void portion)} (5)

(8) Occupancy of Texture

The occupancy of each texture was determined according to the following formula (6) by taking a photograph of a cross-section in the longitudinal direction of the porous hollow-fiber membrane by means of a scanning electron microscope at a magnification of 3,000 times in arbitrary 20 places, and an average value thereof was employed. Here, the area of the entire photograph and the area occupied by a texture were determined by printing the taken photograph on paper and converting respective areas into the weight of paper corresponding to the entire photograph and the weight of paper corresponding to a texture portion cut out therefrom.

Occupancy (%)={(area occupied by each texture)/ (area of entire photograph)}×100 (6)

(9) Crystallization Temperature Tc of Fluororesin-Based Polymer Solution

Using DSC-6200 manufactured by Seiko Instruments & Electronics Ltd., a mixture having the same composition as the membrane-forming polymer raw liquid composition containing a fluororesin-based polymer, a solvent, etc. was sealed in a sealing type DSC container and uniformly dissolved by raising the temperature to a dissolution temperature at a temperature rise rate of 10° C./min and holding the temperature for 30 minutes, and a rise temperature of a crystallization peak observed in the process of thereafter lowering the temperature at a temperature drop rate of 10° C./min was taken as the crystallization temperature Tc.

Example 1

36 wt % of a vinylene fluoride homopolymer (KF1300, produced by Kureha Corporation, weight average molecular weight: 417,000, number average molecular weight: 221,000) and 64 wt % of γ-butyrolactone were dissolved at 150° C. Tc of this vinylidene fluoride homopolymer solution was 48° C. The solution was allowed to stay in a line between two gear pumps for 20 seconds at 99 to 101° C. under a pressure of 2.0 MPa by disposing those gear pumps and then ejected through the outer tube of a double tube-type spinneret, an aqueous 85 wt % γ-butyrolactone solution was simultaneously ejected through the inner tube of the double tube-type spinneret, and these were allowed to stay in a cooling bath at a temperature of 25° C. containing an aqueous 85 wt % γ-butyrolactone solution for 20 seconds to cause solidification. The obtained porous hollow-fiber membrane had a columnar texture with a thickness uniformity of 0.62, where the occupancy of columnar texture was 86% and the occupancy of spherical texture was 14%.

Subsequently, the porous hollow-fiber membrane obtained above was drawn to 2.5 times in water at 95° C. The porous hollow-fiber membrane after drawing was observed, as a result, a columnar texture was recognized. Furthermore, in the porous hollow-fiber membrane, the columnar texture had a representative value of longitudinal length of 16 μm, a representative value of short-side length of 2.2 μm, and a thickness uniformity of 0.61, the porosity was 55%, the orientation degree π of the molecular chain of vinylidene fluoride homopolymer in the longitudinal direction of the porous hollow-fiber membrane was 0.61, the Raman orientation parameter v was 3.12, and M/m was 3.1. The structure and performance of the porous hollow-fiber membrane after drawing are shown in Table 1.

Example 2

36 wt % of a vinylene fluoride homopolymer (KF1300, produced by Kureha Corporation, weight average molecular weight: 417,000, number average molecular weight: 221,000) and 64 wt % of γ-butyrolactone were dissolved at 150° C. Tc of this vinylidene fluoride homopolymer solution was 48° C. The solution was allowed to stay in a line between two gear pumps for 20 seconds at 99 to 101° C. under a pressure of 2.0 MPa by disposing those gear pumps and then ejected through the outer tube of a double tube-type spinneret, an aqueous 85 wt % γ-butyrolactone solution was simultaneously ejected through the inner tube of the double tube-type spinneret, and these were allowed to stay in a first cooling bath at a temperature of 5° C. containing an aqueous 85 wt % γ-butyrolactone solution for 10 seconds and then in a second cooling bath at a temperature of 25° C. containing an aqueous 85 wt % γ-butyrolactone solution for 20 seconds to cause solidification. The obtained porous hollow-fiber membrane had a columnar texture with a thickness uniformity of 0.65, where the occupancy of columnar texture was 87% and the occupancy of spherical texture was 13%.

Subsequently, the porous hollow-fiber membrane obtained above was drawn to 3 times in water at 95° C. The porous hollow-fiber membrane after drawing had a columnar texture with a longitudinal length of 19 μm, a short-side length of 1.8 μm and a thickness uniformity of 0.66, where the porosity was 61%, the orientation degree π of the molecular chain of vinylidene fluoride homopolymer in the longitudinal direction of the porous hollow-fiber membrane was 0.77, the Raman orientation parameter v was 3.74, and M/m was 4.2. The structure and performance of the porous hollow-fiber membrane after drawing are shown in Table 1.

Example 3

38 wt % of a vinylene fluoride homopolymer (KF1300, produced by Kureha Corporation, weight average molecular weight: 417,000, number average molecular weight: 221,000) and 62 wt % of γ-butyrolactone were dissolved at 150° C. Tc of this vinylidene fluoride homopolymer solution was 51° C. The solution was allowed to stay in a line between two gear pumps for 20 seconds at 99 to 101° C. under a pressure of 2.0 MPa by disposing those gear pumps and then ejected through the outer tube of a double tube-type spinneret, an aqueous 85 wt % γ-butyrolactone solution was simultaneously ejected through the inner tube of the double tube-type spinneret, and these were allowed to stay in a first cooling bath at a temperature of 5° C. containing an aqueous 85 wt % γ-butyrolactone solution for 10 seconds and then in a second cooling bath at a temperature of 35° C. containing an aqueous 85 wt % γ-butyrolactone solution for 50 seconds to cause solidification. The obtained porous hollow-fiber membrane had a columnar texture with a thickness uniformity of 0.66, where the occupancy of columnar texture was 91% and the occupancy of spherical texture was 9%.

Subsequently, the porous hollow-fiber membrane obtained above was drawn to 3 times in water at 95° C. The porous hollow-fiber membrane after drawing had a columnar texture with a longitudinal length of 24 μm, a short-side length of 1.6 μm and a thickness uniformity of 0.66, where the porosity was 59%, the orientation degree π of the molecular chain of vinylidene fluoride homopolymer in the longitudinal direction of the porous hollow-fiber membrane was 0.85, the Raman orientation parameter ν was 4.37, and M/m was 5.0. The structure and performance of the porous hollow-fiber membrane after drawing are shown in Table 1.

Example 4

38 wt % of a vinylene fluoride homopolymer (KF1300, produced by Kureha Corporation, weight average molecular weight: 417,000, number average molecular weight: 221,000) and 62 wt % of γ-butyrolactone were dissolved at 150° C. Tc of this vinylidene fluoride homopolymer solution was 51° C. The solution was allowed to stay in a line between two gear pumps for 20 seconds at 99 to 101° C. under a pressure of 2.0 MPa by disposing those gear pumps and then ejected through the outer tube of a double tube-type spinneret, an aqueous 85 wt % γ-butyrolactone solution was simultaneously ejected through the inner tube of the double tube-type spinneret, and these were allowed to stay in a first cooling bath at a temperature of 5° C. containing an aqueous 85 wt % γ-butyrolactone solution for 10 seconds and then in a second cooling bath at a temperature of 35° C. containing an aqueous 85 wt % γ-butyrolactone solution for 50 seconds to cause solidification. The obtained porous hollow-fiber membrane had a columnar texture with a thickness uniformity of 0.66, where the occupancy of columnar texture was 91% and the occupancy of spherical texture was 9%.

Subsequently, the porous hollow-fiber membrane obtained above was drawn to 3.5 times in water at 95° C. The porous hollow-fiber membrane after drawing had a columnar texture with a longitudinal length of 28 μm, a short-side length of 1.3 μm and a thickness uniformity of 0.62, where the porosity was 61%, the orientation degree π of the molecular chain of vinylidene fluoride homopolymer in the longitudinal direction of the porous hollow-fiber membrane was 0.89, the Raman orientation parameter ν was 4.42, and M/m was 5.1. The structure and performance of the porous hollow-fiber membrane after drawing are shown in Table 1.

Figure 2:
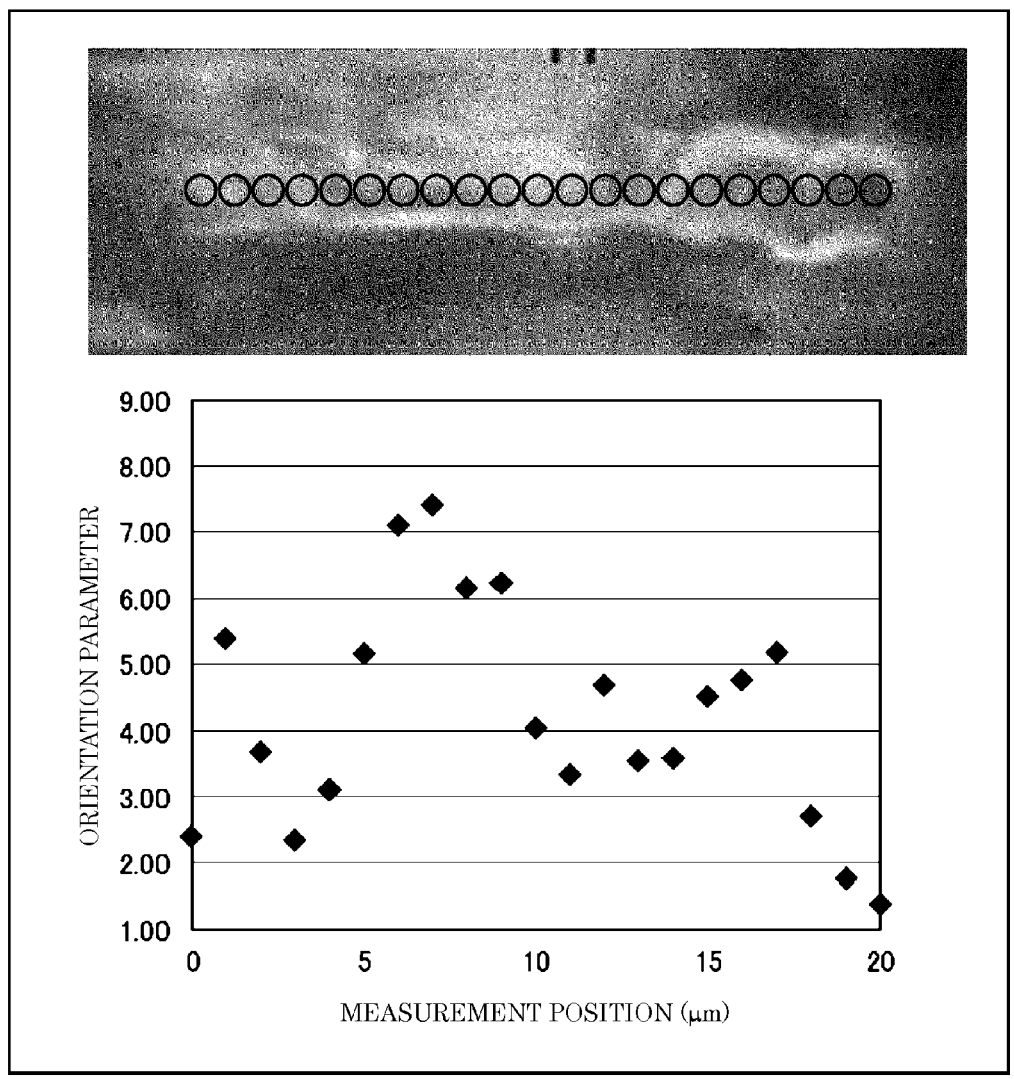
FIG. 2 is a view illustrating a Raman orientation parameter at each measurement site of the porous hollow-fiber membrane of Example 4.
Figure 3:
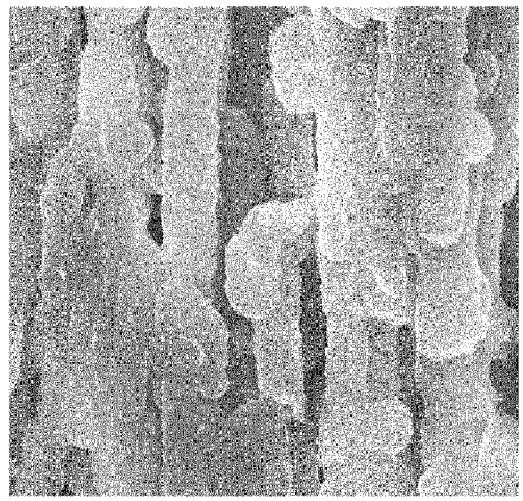
FIG. 3 is a view illustrating a longitudinally sectional photograph of the porous hollow-fiber membrane of Example 4.

In addition, the intensity distribution in the azimuth angle direction at 2θ=20.4° of the porous hollow-fiber membrane after drawing is illustrated in FIG. 1, the Raman orientation parameter at each measurement site of the porous hollow-fiber membrane is illustrated in FIG. 2, and the longitudinally sectional photograph of the porous hollow-fiber membrane is illustrated in FIG. 3.

Example 5

40 wt % of a vinylene fluoride homopolymer (KF1300, produced by Kureha Corporation, weight average molecular weight: 417,000, number average molecular weight: 221,000) and 60 wt % of dimethylsulfoxide were dissolved at 130° C. Tc of this vinylidene fluoride homopolymer solution was 30° C. The solution was allowed to stay in a line between two gear pumps for 20 seconds at 78 to 80° C. under a pressure of 2.0 MPa by disposing those gear pumps and then ejected through the outer tube of a double tube-type spinneret, an aqueous 90 wt % dimethylsulfoxide solution was simultaneously ejected through the inner tube of the double tube-type spinneret, and these were allowed to stay in a cooling bath at a temperature of 30° C. containing an aqueous 85 wt % dimethylsulfoxide solution for 20 seconds to cause solidification. The obtained porous hollow-fiber membrane had a columnar texture with a thickness uniformity of 0.62, where the occupancy of columnar texture was 93% and the occupancy of spherical texture was 7%.

Subsequently, the porous hollow-fiber membrane obtained above was drawn to 2.5 times in water at 95° C. The porous hollow-fiber membrane after drawing had a columnar texture with a longitudinal length of 20 μm, a short-side length of 2.1 μm and a thickness uniformity of 0.61, where the porosity was 64%, the orientation degree π of the molecular chain of vinylidene fluoride homopolymer in the longitudinal direction of the porous hollow-fiber membrane was 0.66, the Raman orientation parameter ν was 3.40, and M/m was 3.5. The structure and performance of the porous hollow-fiber membrane after drawing are shown in Table 1.

Example 6

40 wt % of a vinylene fluoride homopolymer (KF1300, produced by Kureha Corporation, weight average molecular weight: 417,000, number average molecular weight: 221,000) and 60 wt % of dimethylsulfoxide were dissolved at 130° C. Tc of this vinylidene fluoride homopolymer solution was 30° C. The solution was allowed to stay in a line between two gear pumps for 20 seconds at 78 to 80° C. under a pressure of 2.0 MPa by disposing those gear pumps and then ejected through the outer tube of a double tube-type spinneret, an aqueous 90 wt % dimethylsulfoxide solution was simultaneously ejected through the inner tube of the double tube-type spinneret, and these were allowed to stay in a first cooling bath at a temperature of −5° C. containing an aqueous 85 wt % dimethylsulfoxide solution for 10 seconds and then in a second cooling bath at a temperature of 15° C. containing an aqueous 85 wt % dimethylsulfoxide solution for 30 seconds to cause solidification. The obtained porous hollow-fiber membrane had a columnar texture with a thickness uniformity of 0.72, where the occupancy of columnar texture was 92% and the occupancy of spherical texture was 8%.

Subsequently, the porous hollow-fiber membrane obtained above was drawn to 3 times in water at 95° C. The porous hollow-fiber membrane after drawing had a columnar texture with a longitudinal length of 27 μm, a short-side length of 1.7 μm and a thickness uniformity of 0.69, where the porosity was 64%, the orientation degree π of the molecular chain of vinylidene fluoride homopolymer in the longitudinal direction of the porous hollow-fiber membrane was 0.86, the Raman orientation parameter ν was 4.38, and M/m was 5.1. The structure and performance of the porous hollow-fiber membrane after drawing are shown in Table 1.

Example 7

40 wt % of a vinylene fluoride homopolymer (KF1300, produced by Kureha Corporation, weight average molecular weight: 417,000, number average molecular weight: 221,000) and 60 wt % of dimethylsulfoxide were dissolved at 130° C. Tc of this vinylidene fluoride homopolymer solution was 30° C. The solution was allowed to stay in a line between two gear pumps for 20 seconds at 78 to 80° C. under a pressure of 2.0 MPa by disposing those gear pumps and then ejected through the outer tube of a double tube-type spinneret, an aqueous 90 wt % dimethylsulfoxide solution was simultaneously ejected through the inner tube of the double tube-type spinneret, and these were allowed to stay in a first cooling bath at a temperature of −5° C. containing an aqueous 85 wt % dimethylsulfoxide solution for 10 seconds and then in a second cooling bath at a temperature of 20° C. containing an aqueous 85 wt % dimethylsulfoxide solution for 50 seconds to cause solidification. The obtained porous hollow-fiber membrane had a columnar texture with a thickness uniformity of 0.72, where the occupancy of columnar texture was 95% and the occupancy of spherical texture was 5%.

Subsequently, the porous hollow-fiber membrane obtained above was drawn to 3.5 times in water at 95° C. The porous hollow-fiber membrane after drawing had a columnar texture with a longitudinal length of 35 μm, a short-side length of 1.5 μm and a thickness uniformity of 0.67, where the porosity was 65%, the orientation degree π of the molecular chain of vinylidene fluoride homopolymer in the longitudinal direction of the porous hollow-fiber membrane was 0.91, the Raman orientation parameter ν was 4.62, and M/m was 5.8. The structure and performance of the porous hollow-fiber membrane after drawing are shown in Table 1.

Example 8

40 wt % of a vinylene fluoride homopolymer (KF1300, produced by Kureha Corporation, weight average molecular weight: 417,000, number average molecular weight: 221,000) and 60 wt % of dimethylsulfoxide were dissolved at 130° C. Tc of this vinylidene fluoride homopolymer solution was 30° C. The solution was allowed to stay in a line between two gear pumps for 20 seconds at 78 to 80° C. under a pressure of 2.0 MPa by disposing those gear pumps and then ejected through the outer tube of a double tube-type spinneret, an aqueous 90 wt % dimethylsulfoxide solution was simultaneously ejected through the inner tube of the double tube-type spinneret, and these were allowed to stay in a first cooling bath at a temperature of −5° C. containing an aqueous 85 wt % dimethylsulfoxide solution for 10 seconds and then in a second cooling bath at a temperature of 20° C. containing an aqueous 85 wt % dimethylsulfoxide solution for 50 seconds to cause solidification. The obtained porous hollow-fiber membrane had a columnar texture with a thickness uniformity of 0.72, where the occupancy of columnar texture was 95% and the occupancy of spherical texture was 5%.

Subsequently, the porous hollow-fiber membrane obtained above was drawn to 4 times in water at 95° C. The porous hollow-fiber membrane after drawing had a columnar texture with a longitudinal length of 40 μm, a short-side length of 1.1 μm and a thickness uniformity of 0.63, where the porosity was 66%, the orientation degree π of the molecular chain of vinylidene fluoride homopolymer in the longitudinal direction of the porous hollow-fiber membrane was 0.92, the Raman orientation parameter ν was 4.76, and M/m was 6.2. The structure and performance of the porous hollow-fiber membrane after drawing are shown in Table 1.

Example 9

15 wt % of a vinylene fluoride homopolymer (KF1300, produced by Kureha Corporation, weight average molecular weight: 417,000, number average molecular weight: 221,000), 3 wt % of polyethylene glycol having a weight average molecular weight of 20,000, 80 wt % of N-methyl-2-pyrrolidone, and 2 wt % of water were mixed and dissolved at a temperature of 95° C. to obtain a polymer solution.

The polymer solution was uniformly applied onto the surface of the hollow-fiber membrane (outer diameter: 1,240 μm, inner diameter: 740 μm, thickness: 250 μm) obtained after drawing in Example 2 and immediately coagulated in a water bath to manufacture a porous hollow-fiber membrane in which a layer of a three-dimensional network structure (thickness: 30 μm) was formed on a layer having a columnar texture. Here, the thickness of three-dimensional network structure layer relative to the thickness of the layer having a columnar texture was 0.12. The layer having a columnar texture of this porous hollow-fiber membrane was observed, as a result, the layer had a columnar texture with a longitudinal length of 40 μm, a short-side length of 1.1 μm and a thickness uniformity of 0.63, the occupancy of columnar texture was 87%, the occupancy of spherical texture was 13%, the porosity was 66%, the Raman orientation parameter ν was 4.75, and M/m was 6.0. There was caused almost no difference from Example 2 even when a three-dimensional network structure layer was formed.

In addition, the orientation degree π of the molecular chain of vinylidene fluoride homopolymer in the longitudinal direction of the porous hollow-fiber membrane was 0.89, and there was caused almost no difference from Example 2 even when a three-dimensional network structure layer was formed.

Comparative Example 1

38 wt % of a vinylene fluoride homopolymer (KF1300, produced by Kureha Corporation, weight average molecular weight: 417,000, number average molecular weight: 221,000) and 62 wt % of γ-butyrolactone were dissolved at 150° C. Tc of this vinylidene fluoride homopolymer solution was 51° C. The solution was allowed to stay in a line between two gear pumps for 20 seconds at 99 to 101° C. under a pressure of 2.0 MPa by disposing those gear pumps and then ejected through the outer tube of a double tube-type spinneret, an aqueous 85 wt % γ-butyrolactone solution was simultaneously ejected through the inner tube of the double tube-type spinneret, and these were allowed to stay in a cooling bath at a temperature of 5° C. containing an aqueous 85 wt % γ-butyrolactone solution for 20 seconds to cause solidification. The obtained porous hollow-fiber membrane had a fibrous texture with a thickness uniformity of 0.47, where the occupancy of fibrous texture was 91% and the occupancy of spherical texture was 9%.

Subsequently, the porous hollow-fiber membrane obtained above was drawn to 1.5 times in water at 95° C.

The porous hollow-fiber membrane after drawing had a fibrous texture with a longitudinal length of 15 μm, a short-side length of 2.2 μm and a thickness uniformity of 0.45, where the porosity was 63%, the molecular chain of vinylidene fluoride homopolymer was not oriented, the Raman orientation parameter ν was 1.01, and M/m was 1.0. The structure and performance of the porous hollow-fiber membrane after drawing are shown in Table 2.

Figure 4:
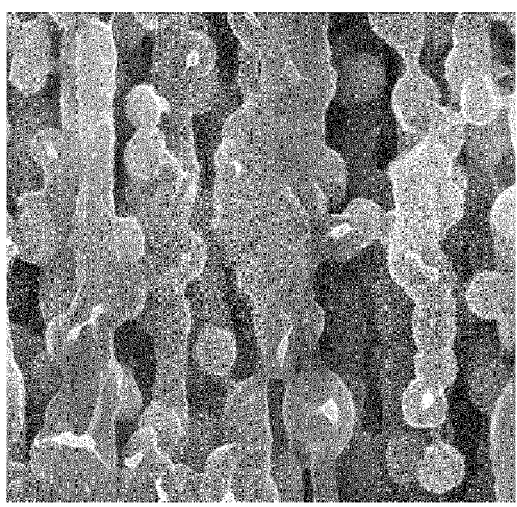
FIG. 4 is a view illustrating a longitudinally sectional photograph of the porous hollow-fiber membrane of Comparative Example 1.

In addition, the intensity distribution in the azimuth angle direction at 2θ=20.4° of the porous hollow-fiber membrane after drawing is illustrated in FIG. 1, and the longitudinally sectional photograph of the porous hollow-fiber membrane is illustrated in FIG. 4.

Comparative Example 2

38 wt % of a vinylene fluoride homopolymer (KF1300, produced by Kureha Corporation, weight average molecular weight: 417,000, number average molecular weight: 221,000) and 62 wt % of γ-butyrolactone were dissolved at 150° C. Tc of this vinylidene fluoride homopolymer solution was 51° C. The solution was allowed to stay in a line between two gear pumps for 20 seconds at 99 to 101° C. under a pressure of 2.0 MPa by disposing those gear pumps and then ejected through the outer tube of a double tube-type spinneret, an aqueous 85 wt % γ-butyrolactone solution was simultaneously ejected through the inner tube of the double tube-type spinneret, and these were allowed to stay in a cooling bath at a temperature of 5° C. containing an aqueous 85 wt % γ-butyrolactone solution for 20 seconds to cause solidification. The obtained porous hollow-fiber membrane had a fibrous texture with a thickness uniformity of 0.47, where the occupancy of fibrous texture was 91% and the occupancy of spherical texture was 9%.

Subsequently, the porous hollow-fiber membrane obtained above was drawn to 2.5 times in water at 95° C. The porous hollow-fiber membrane after drawing had a fibrous texture with a longitudinal length of 18 μm, a short-side length of 1.7 μm and a thickness uniformity of 0.42, where the porosity was 65%, the molecular chain of vinylidene fluoride homopolymer was not oriented, the Raman orientation parameter ν was 1.03, and M/m was 1.1. The structure and performance of the porous hollow-fiber membrane after drawing are shown in Table 2.

Comparative Example 3

38 wt % of a vinylene fluoride homopolymer (KF1300, produced by Kureha Corporation, weight average molecular weight: 417,000, number average molecular weight: 221,000) and 62 wt % of γ-butyrolactone were dissolved at 150° C. Tc of this vinylidene fluoride homopolymer solution was 51° C. The solution was allowed to stay in a line between two gear pumps for 20 seconds at 99 to 101° C. under a pressure of 2.0 MPa by disposing those gear pumps and then ejected through the outer tube of a double tube-type spinneret, an aqueous 85 wt % γ-butyrolactone solution was simultaneously ejected through the inner tube of the double tube-type spinneret, and these were allowed to stay in a cooling bath at a temperature of 5° C. containing an aqueous 85 wt % γ-butyrolactone solution for 20 seconds to cause solidification. The obtained porous hollow-fiber membrane had a fibrous texture with a thickness uniformity of 0.47, where the occupancy of fibrous texture was 91% and the occupancy of spherical texture was 9%.

Subsequently, the porous hollow-fiber membrane obtained above was drawn to 3.5 times in water at 95° C., but fiber breakage occurred, and the membrane could not be drawn.

Comparative Example 4

36 wt % of a vinylene fluoride homopolymer (KF1300, produced by Kureha Corporation, weight average molecular weight: 417,000, number average molecular weight: 221,000) and 64 wt % of γ-butyrolactone were dissolved at 150° C. Tc of this vinylidene fluoride homopolymer solution was 48° C. The solution was allowed to stay in a line between two gear pumps for 20 seconds at 99 to 101° C. under a pressure of 0.2 MPa by disposing those gear pumps and then ejected through the outer tube of a double tube-type spinneret, an aqueous 85 wt % γ-butyrolactone solution was simultaneously ejected through the inner tube of the double tube-type spinneret, and these were allowed to stay in a cooling bath at a temperature of 25° C. containing an aqueous 85 wt % γ-butyrolactone solution for 20 seconds to cause solidification. The obtained porous hollow-fiber membrane had a fibrous texture with a thickness uniformity of 0.42, where the occupancy of fibrous texture was 24% and the occupancy of spherical texture was 76%.

Subsequently, the porous hollow-fiber membrane obtained above was drawn to 2 times in water at 95° C., but fiber breakage occurred, and the membrane could not be drawn.

Comparative Example 5

40 wt % of a vinylidene fluoride homopolymer (KF1300, produced by Kureha Corporation, weight average molecular weight: 417,000, number average molecular weight: 221,000) and 60 wt % of dimethylsulfoxide were dissolved at 130° C. Tc of this vinylidene fluoride homopolymer solution was 30° C. The solution was allowed to stay in a line between two gear pumps for 20 seconds at 78 to 80° C. under a pressure of 2.0 MPa by disposing those gear pumps and then ejected through the outer tube of a double tube-type spinneret, an aqueous 90 wt % dimethylsulfoxide solution was simultaneously ejected through the inner tube of the double tube-type spinneret, and these were allowed to stay in a cooling bath at a temperature of 0° C. containing an aqueous 85 wt % dimethylsulfoxide solution for 20 seconds to cause solidification. The obtained porous hollow-fiber membrane had a fibrous texture with a thickness uniformity of 0.56, where the occupancy of fibrous texture was 84% and the occupancy of spherical texture was 16%.

Subsequently, the porous hollow-fiber membrane obtained above was drawn to 1.5 times in water at 95° C. The porous hollow-fiber membrane after drawing had a fibrous texture with a longitudinal length of 18 μm, a short-side length of 1.2 μm and a thickness uniformity of 0.53, where the porosity was 64%, the molecular chain of vinylidene fluoride homopolymer was not oriented, the Raman orientation parameter ν was 1.03, and M/m was 1.1. The structure and performance of the porous hollow-fiber membrane after drawing are shown in Table 2.

Comparative Example 6

40 wt % of a vinylene fluoride homopolymer (KF1300, produced by Kureha Corporation, weight average molecular weight: 417,000, number average molecular weight: 221,000) and 60 wt % of dimethylsulfoxide were dissolved at 130° C. Tc of this vinylidene fluoride homopolymer solution was 30° C. The solution was allowed to stay in a line between two gear pumps for 20 seconds at 78 to 80° C. under a pressure of 2.0 MPa by disposing those gear pumps and then ejected through the outer tube of a double tube-type spinneret, an aqueous 90 wt % dimethylsulfoxide solution was simultaneously ejected through the inner tube of the double tube-type spinneret, and these were allowed to stay in a cooling bath at a temperature of 0° C. containing an aqueous 85 wt % dimethylsulfoxide solution for 20 seconds to cause solidification. The obtained porous hollow-fiber membrane had a fibrous texture with a thickness uniformity of 0.56, where the occupancy of fibrous texture was 84% and the occupancy of spherical texture was 16%.

Subsequently, the porous hollow-fiber membrane obtained above was drawn to 2.5 times in water at 95° C. The porous hollow-fiber membrane after drawing had a fibrous texture with a longitudinal length of 22 μm, a short-side length of 1.0 μm and a thickness uniformity of 0.51, where the porosity was 65%, the molecular chain of vinylidene fluoride homopolymer was not oriented, the Raman orientation parameter ν was 1.05, and M/m was 1.1. The structure and performance of the porous hollow-fiber membrane after drawing are shown in Table 2.

Comparative Example 7

28 wt % of a vinylene fluoride homopolymer (KF1300, produced by Kureha Corporation, weight average molecular weight: 417,000, number average molecular weight: 221,000) and 72 wt % of dimethylsulfoxide were dissolved at 130° C. Tc of this vinylidene fluoride homopolymer solution was 20° C. The solution was allowed to stay in a line between two gear pumps for 20 seconds at 64 to 66° C. under a pressure of 2.0 MPa by disposing those gear pumps and then ejected through the outer tube of a double tube-type spinneret, an aqueous 90 wt % dimethylsulfoxide solution was simultaneously ejected through the inner tube of the double tube-type spinneret, and these were allowed to stay in a cooling bath at a temperature of 0° C. containing an aqueous 85 wt % dimethylsulfoxide solution for 20 seconds to cause solidification. The obtained porous hollow-fiber membrane had a fibrous texture with a thickness uniformity of 0.42, where the occupancy of fibrous texture was 88% and the occupancy of spherical texture was 12%.

Subsequently, the porous hollow-fiber membrane obtained above was drawn to 1.5 times in water at 95° C. The porous hollow-fiber membrane after drawing had a fibrous texture with a longitudinal length of 14 μm, a short-side length of 1.2 μm and a thickness uniformity of 0.41, where the porosity was 71%, the molecular chain of vinylidene fluoride homopolymer was not oriented, the Raman orientation parameter ν was 1.04, and M/m was 1.1. The structure and performance of the porous hollow-fiber membrane after drawing are shown in Table 2.

Comparative Example 8

28 wt % of a vinylene fluoride homopolymer (KF1300, produced by Kureha Corporation, weight average molecular weight: 417,000, number average molecular weight: 221,000) and 72 wt % of dimethylsulfoxide were dissolved at 130° C. Tc of this vinylidene fluoride homopolymer solution was 20° C. The solution was allowed to stay in a line between two gear pumps for 20 seconds at 64 to 66° C. under a pressure of 2.0 MPa by disposing those gear pumps and then ejected through the outer tube of a double tube-type spinneret, an aqueous 90 wt % dimethylsulfoxide solution was simultaneously ejected through the inner tube of the double tube-type spinneret, and these were allowed to stay in a cooling bath at a temperature of 0° C. containing an aqueous 85 wt % dimethylsulfoxide solution for 20 seconds to cause solidification. The obtained porous hollow-fiber membrane had a fibrous texture with a thickness uniformity of 0.42, where the occupancy of fibrous texture was 88% and the occupancy of spherical texture was 12%.

Subsequently, the porous hollow-fiber membrane obtained above was drawn to 2.5 times in water at 95° C. The porous hollow-fiber membrane after drawing had a fibrous texture with a longitudinal length of 19 μm, a short-side length of 0.8 μm and a thickness uniformity of 0.37, where the porosity was 73%, the molecular chain of vinylidene fluoride homopolymer was not oriented, the Raman orientation parameter ν was 1.06, and M/m was 1.2. The structure and performance of the porous hollow-fiber membrane after drawing are shown in Table 2.

Comparative Example 9

15 wt % of a vinylene fluoride homopolymer (KF1300, produced by Kureha Corporation, weight average molecular weight: 417,000, number average molecular weight: 221,000) and 85 wt % of dimethylacetamide were dissolved at 100° C. This vinylidene fluoride homopolymer solution did not have Tc, because dimethylacetamide is a good solvent for the vinylidene fluoride homopolymer. The solution was allowed to stay in a line between two gear pumps for 20 seconds at 99 to 101° C. under a pressure of 0.2 MPa by disposing those gear pumps and then ejected through the outer tube of a double tube-type spinneret, an aqueous 85 wt % dimethylacetamide solution was simultaneously ejected through the inner tube of the double tube-type spinneret, and these were allowed to stay in a cooling bath at a temperature of 25° C. containing an aqueous 85 wt % dimethylacetamide solution for 40 seconds to cause solidification. The obtained porous hollow-fiber membrane did not have all of a spherical texture, a fibrous texture, and a columnar texture but had a three-dimensional network structure.

Subsequently, the porous hollow-fiber membrane obtained above was drawn to 2 times in water at 95° C., but fiber breakage occurred, and the membrane could not be drawn.

TABLE 1

| | | Example 1 | Example 2 | Example 3 | Example 4 | Example 5 | Example 6 | Example 7 | Example 8 |
|---|---|---|---|---|---|---|---|---|---|
| Before drawing | Fluororesin-based polymer concentration | 36 | 36 | 38 | 38 | 40 | 40 | 40 | 40 |
| | Kind of solvent | | | γ-butyrolactone | | | | dimethylsulfoxide | |
| | Crystallization temperature Tc (° C.) | 48 | 48 | 51 | 51 | 30 | 30 | 30 | 30 |

TABLE 1-continued

|  |  | Example 1 | Example 2 | Example 3 | Example 4 | Example 5 | Example 6 | Example 7 | Example 8 |
|---|---|---|---|---|---|---|---|---|---|
|  | First cooling bath temperature (° C.) | 25 | 5 | 5 | 5 | 20 | −5 | −5 | −5 |
|  | First cooling bath time (sec) | 20 | 10 | 10 | 10 | 20 | 10 | 10 | 10 |
|  | Second cooling bath temperature (° C.) | — | 25 | 35 | 35 | — | 15 | 20 | 20 |
|  | Second cooling bath time (sec) | — | 20 | 50 | 50 | — | 30 | 50 | 50 |
|  | Thickness uniformity (-) | 0.62 | 0.65 | 0.66 | 0.66 | 0.62 | 0.72 | 0.72 | 0.72 |
|  | Occupancy of spherical structure (%) | 14 | 13 | 9 | 9 | 7 | 8 | 5 | 5 |
| After drawing | Draw ratio (times) | 2.5 | 3 | 3 | 3.5 | 2.5 | 3 | 3.5 | 4 |
|  | Orientation degree π | 0.61 | 0.77 | 0.85 | 0.89 | 0.66 | 0.86 | 0.91 | 0.92 |
|  | Raman orientation parameter ν | 3.12 | 3.74 | 4.37 | 4.42 | 3.40 | 4.38 | 4.62 | 4.76 |
|  | M/m | 3.1 | 4.2 | 5.0 | 5.1 | 3.5 | 5.1 | 5.8 | 6.2 |
|  | Thickness uniformity (-) | 0.61 | 0.66 | 0.66 | 0.62 | 0.61 | 0.69 | 0.67 | 0.63 |
|  | Porosity (%) | 55 | 61 | 59 | 61 | 64 | 64 | 65 | 66 |
| Performance | Pure-water permeation performance (m³/m²/h) | 2.1 | 2.6 | 2.2 | 2.6 | 2.1 | 2.3 | 2.6 | 2.8 |
|  | Breaking strength (MPa) | 27 | 40 | 48 | 62 | 35 | 52 | 64 | 68 |
|  | Elongation at break (%) | 165 | 112 | 101 | 75 | 144 | 115 | 82 | 51 |

TABLE 2

|  |  | Comparative Example 1 | Comparative Example 2 | Comparative Example 3 | Comparative Example 4 |
|---|---|---|---|---|---|
| Before drawing | Fluororesin-based polymer concentration | 38 | 38 | 38 | 36 |
|  | Kind of solvent |  | γ-butyrolactone |  |  |
|  | Crystallization temperature Tc (° C.) | 51 | 51 | 51 | 48 |
|  | First cooling bath temperature (° C.) | 5 | 5 | 5 | 5 |
|  | First cooling bath time (sec) | 20 | 20 | 20 | 20 |
|  | Second cooling bath temperature (° C.) | — | — | — | — |
|  | Second cooling bath time (sec) | — | — | — | — |
|  | Thickness uniformity (-) | 0.47 | 0.47 | 0.47 | 0.42 |
|  | Occupancy of spherical structure (%) | 9 | 9 | 9 | 76 |
| After drawing | Draw ratio (times) | 1.5 | 2.5 | 3.5 | 2 |
|  | Orientation degree π | not oriented | not oriented | fiber breakage | fiber breakage |
|  | Raman orientation parameter ν | 1.01 | 1.03 |  |  |
|  | M/m | 1.0 | 1.1 |  |  |
|  | Thickness uniformity (-) | 0.45 | 0.42 |  |  |
|  | Porosity (%) | 63 | 65 |  |  |
| Performance | Pure-water permeation performance (m³/m²/h) | 2.3 | 2.6 |  |  |
|  | Breaking strength (MPa) | 14 | 18 |  |  |
|  | Elongation at break (%) | 130 | 62 |  |  |

|  |  | Comparative Example 5 | Comparative Example 6 | Comparative Example 7 | Comparative Example 8 | Comparative Example 9 |
|---|---|---|---|---|---|---|
| Before drawing | Fluororesin-based polymer concentration | 40 | 40 | 28 | 28 | 15 |
|  | Kind of solvent |  | dimethylsulfoxide |  |  | dimethyl-acetamide |
|  | Crystallization temperature Tc (° C.) | 30 | 30 | 20 | 20 | — |
|  | First cooling bath temperature (° C.) | 0 | 0 | 0 | 0 | 25 |
|  | First cooling bath time (sec) | 20 | 20 | 20 | 20 | 40 |
|  | Second cooling bath temperature (° C.) | — | — | — | — | — |
|  | Second cooling bath time (sec) | — | — | — | — | — |

TABLE 2-continued

|  |  |  |  |  |  |  |
|---|---|---|---|---|---|---|
|  | Thickness uniformity (-) | 0.56 | 0.56 | 0.42 | 0.42 | — |
|  | Occupancy of spherical structure (%) | 16 | 16 | 12 | 12 | — |
| After drawing | Draw ratio (times) | 1.5 | 2.5 | 1.5 | 2.5 | 2 |
|  | Orientation degree π | not oriented | not oriented | not oriented | not oriented | fiber breakage |
|  | Raman orientation parameter ν | 1.03 | 1.05 | 1.04 | 1.06 |  |
|  | M/m | 1.1 | 1.1 | 1.1 | 1.2 |  |
|  | Thickness uniformity (-) | 0.53 | 0.51 | 0.41 | 0.37 |  |
|  | Porosity (%) | 64 | 65 | 71 | 73 |  |
| Performance | Pure-water permeation performance (m³/m²/h) | 0.8 | 1.3 | 1.2 | 1.3 |  |
|  | Breaking strength (MPa) | 18 | 23 | 18 | 21 |  |
|  | Elongation at break (%) | 185 | 85 | 210 | 99 |  |

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2014-264345) filed on Dec. 26, 2014, the contents of which are incorporated herein by way of reference.

INDUSTRIAL APPLICABILITY

According to the present invention, a porous hollow-fiber membrane having both excellent physical durability and high pure-water permeation performance while possessing excellent chemical durability due to a fluororesin-based polymer having high chemical resistance is provided. Consequently, when the porous hollow-fiber membrane is applied to a water treatment field, filtration can be stably performed for a long period of time while performing chemical cleaning.

The invention claimed is:

1. A porous hollow-fiber membrane comprising a fluororesin-based polymer,
   wherein the porous hollow-fiber membrane has a columnar texture oriented in a longitudinal direction of the porous hollow-fiber membrane,
   a molecular chain of the fluororesin-based polymer is oriented in the longitudinal direction of the porous hollow-fiber membrane,
   an orientation degree π of the molecular chain calculated based on the following formula (1) is 0.4 or more and less than 1.0:

Orientation degree π=(180°−H)/180°     (1)

provided that H is a half-width(°)of a diffraction intensity distribution in a circumferential direction of a wide-angle X-ray diffraction image, and
   the columnar texture has a short-side length of from 0.5 µm to 3 µm, and has an aspect ratio of 3 or more.

2. The porous hollow-fiber membrane according to claim 1, wherein the columnar texture has a thickness uniformity of 0.60 or more.

3. The porous hollow-fiber membrane according to claim 1, wherein the half-width H is a half-width of an intensity distribution obtained by circumferentially scanning a crystal peak (2θ=20.4°) derived from a (110) plane of polyvinylidene fluoride in wide-angle X-ray diffraction measurement.

4. The porous hollow-fiber membrane according to claim 1, wherein, when the wide-angle X-ray diffraction measurement is performed at measurement points at 1 cm intervals in the longitudinal direction of the porous hollow-fiber membrane, the orientation degree π is 0.4 or more and less than 1.0 at 80% or more of the measurement points.

5. The porous hollow-fiber membrane according to claim 1, wherein the fluororesin-based polymer is polyvinylidene fluoride, and a Raman orientation parameter ν of the molecular chain obtained by Raman spectroscopy is 3.0 or more.

6. The porous hollow-fiber membrane according to claim 1, which has a porosity of from 50 to 80%.

7. The porous hollow-fiber membrane according to claim 1, which has a pure-water permeation performance at 50 kPa and 25° C. of 0.7 m³/m²/hr or more and a breaking strength of 25 MPa or more.

8. The porous hollow-fiber membrane according to claim 1, which is formed by thermally induced phase separation.

* * * * *